US011250147B2

(12) United States Patent
Jassal et al.

(10) Patent No.: US 11,250,147 B2
(45) Date of Patent: *Feb. 15, 2022

(54) HYBRID APPROACH TO DATA GOVERNANCE

(71) Applicant: Egnyte, Inc., Mountain View, CA (US)

(72) Inventors: Amrit Jassal, Morgan Hill, CA (US); Shishir Sharma, Mountain View, CA (US); Sean H. Puttergill, Sunnyvale, CA (US); Ramakrishnan Sundararaj, Sunnyvale, CA (US)

(73) Assignee: Egnyte, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,125

(22) Filed: Apr. 14, 2017

(65) Prior Publication Data

US 2017/0300706 A1    Oct. 19, 2017

Related U.S. Application Data

(62) Division of application No. 15/487,947, filed on Apr. 14, 2017.

(Continued)

(51) Int. Cl.
*G06F 21/00* (2013.01)
*G06F 21/62* (2013.01)
(Continued)

(52) U.S. Cl.
CPC ........ *G06F 21/6218* (2013.01); *G06F 16/122* (2019.01); *G06F 16/128* (2019.01); *G06F 16/183* (2019.01); *G06F 16/2365* (2019.01)

(58) Field of Classification Search
CPC .......... G06F 21/6218; G06F 17/30082; G06F 17/30088; G06F 17/30203; G06F 17/30371
See application file for complete search history.

(56) References Cited

U.S. PATENT DOCUMENTS 9,166,993 B1 * 10/2015 Liu .................... H04L 63/1425
9,275,065 B1 *  3/2016 Ganesh ............. G06F 17/30082
(Continued)

OTHER PUBLICATIONS

U.S. Appl. No. 15/487, 947, Office Action dated Nov. 26, 2019.

*Primary Examiner* — Trong H Nguyen
*Assistant Examiner* — Michael M Lee
(74) *Attorney, Agent, or Firm* — Larry E. Henneman, Jr.; Henneman & Associates, PLC

(57) ABSTRACT

A cloud-based data governance system includes a processing unit, a network adapter, and memory for storing data and code. The network adapter establishes a connection with a remote data storage system associated with a remote file system over a wide-area network (WAN). The code includes an event collection interface, a data governance service, and an enforcement service. The event collection interface is configured to capture an event from the remote data storage system. The event is indicative of a file system operation executed on a data object of the remote file system. The data governance service is configured to receive the event from the event collection interface and to process the event to determine whether the file system operation conflicts with a governance policy of the data governance system. The enforcement service executes a set of remediation actions if the file system operation does conflict with the governance policy.

25 Claims, 26 Drawing Sheets

Related U.S. Application Data

(60) Provisional application No. 62/322,722, filed on Apr. 14, 2016.

(51) Int. Cl.
　　*G06F 16/11*　　　(2019.01)
　　*G06F 16/182*　　(2019.01)
　　*G06F 16/23*　　　(2019.01)

(56) References Cited

U.S. PATENT DOCUMENTS

| | | | |
|---|---|---|---|
| 9,460,169 B2 * | 10/2016 | Hinton | G06F 16/25 |
| 9,465,778 B1 * | 10/2016 | DeBo | G06Q 10/063 |
| 2006/0179140 A1 * | 8/2006 | John | H04L 63/102 |
| | | | 709/225 |
| 2010/0242082 A1 * | 9/2010 | Keene | G06F 21/6218 |
| | | | 726/1 |
| 2014/0040196 A1 * | 2/2014 | Wijayaratne | G06F 17/30174 |
| | | | 707/624 |
| 2014/0149461 A1 * | 5/2014 | Wijayaratne | G06F 17/30194 |
| | | | 707/785 |
| 2014/0201848 A1 * | 7/2014 | Kulkarni | G06F 21/6218 |
| | | | 726/27 |
| 2016/0048645 A1 * | 2/2016 | Webb | G06F 21/6245 |
| | | | 705/2 |
| 2016/0092532 A1 * | 3/2016 | Jia | H04L 47/726 |
| | | | 707/621 |
| 2016/0253513 A1 * | 9/2016 | Dowling | G06Q 20/04 |
| | | | 726/7 |
| 2016/0306827 A1 | 10/2016 | Dos Santos et al. | |
| 2017/0024408 A1 * | 1/2017 | Foley | H04L 63/1408 |

\* cited by examiner

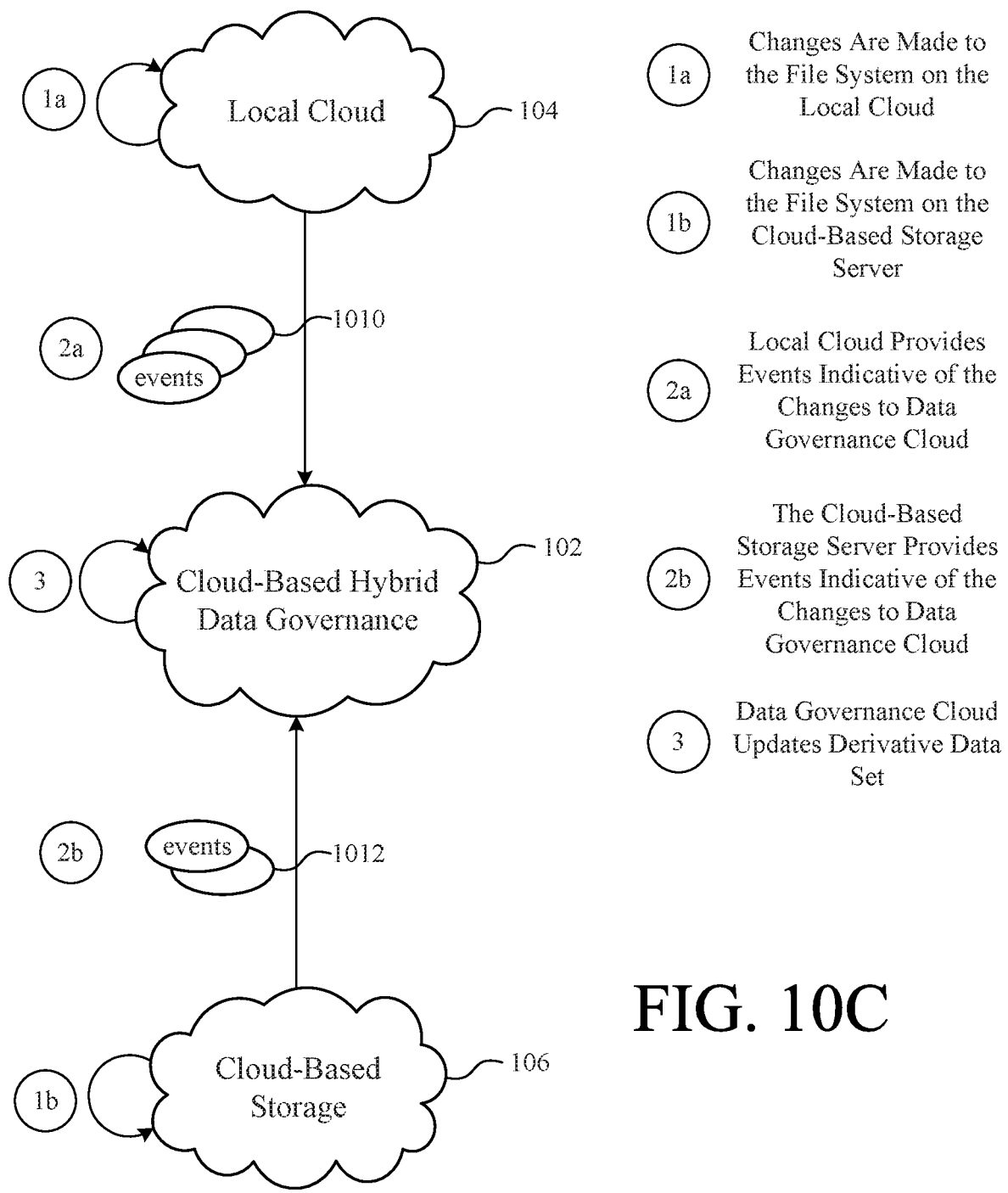

HYBRID APPROACH TO DATA GOVERNANCE

RELATED APPLICATIONS

This application is a divisional of co-pending U.S. patent application Ser. No. 15/487,947, which was filed on Apr. 14, 2017 by the same inventors and which claims the benefit of priority to U.S. Provisional Patent Application No. 62/322,722, which was filed on Apr. 14, 2016 by the same inventors. Both prior applications are incorporated herein by reference in their respective entireties.

BACKGROUND

Field of the Invention

This invention relates generally to cloud computing systems, and more particularly to data governance for cloud computing systems.

Description of the Background Art

Data governance applications are known. Data governance applications allow a user to track data access and modification events across a variety of sources. Some applications allow a user to define and enforce policies to ensure adequate data security. Typically, a data governance application is enterprise-based software that is installed and operated on-premises for tracking access and modification records for each data object on one or more local servers.

As cloud-based data storage and computing have become more popular, the need for data governance for cloud-based data has also increased. One solution for tracking events on a cloud-based server is the utilization of on-premises data governance at each local site associated with a particular cloud server. This solution is disadvantageous, because utilizing data governance deployed on a local system to govern data usage of a remote system creates security concerns. In addition, because these applications are localized, the amount of data that can be processed is limited by the physical properties of the local network on which they are deployed.

Another solution is the utilization of data governance applications on the cloud itself. This solution addresses security concerns, as the data governance application is no longer deployed remotely from the data sources. However, this solution does not provide for data governance of data sources that are deployed locally. It is necessary for separate data governance applications to be deployed on the cloud and on-premises, increasing cost and introducing the need for interfacing between the separate data governance applications. What is needed, therefore, is a single data governance application for monitoring local and cloud-based data sources.

SUMMARY

The present invention overcomes the problems associated with the prior art by providing a cloud-based means for delivering data governance services to a multitude of data sources located on one or more client premises and/or other cloud-based data sources remote with respect to the cloud-based data governance system. The invention facilitates the provision of data governance services via cloud-based software as a service (SaaS).

Methods that can be implemented, for example, in a cloud-based data governance system are disclosed. An example method for providing data governance of a remote data storage system associated with a remote file system includes establishing a connection with the remote data storage system over a wide area network (WAN) and capturing an event associated with the remote file system. The event is indicative of at least one file system operation executed on a data object of the remote data storage system. The example method further includes processing the event to determine whether the event conflicts with a governance policy of the data governance system and, if the event does conflict with the governance policy, executing a set of remediation actions.

In a particular example method, the step of capturing an event associated with the remote file system includes deploying an event collection service to the remote data storage system. The event collection service is operative to detect file system operations executed on data objects of the remote data storage system, to generate events indicative of the file system operations, and to push the events to the data governance system. The method further includes receiving the events from the remote data storage system via the event collection service.

Another particular example method additionally includes receiving a metadata snapshot from the remote data storage system. The metadata snapshot is indicative of the remote file system, and the example method also includes generating a derivative data set indicative of the remote file system based on the metadata snapshot. The step of capturing an event associated with the remote file system includes capturing metadata associated with one or both of at least one file system operation and a data object of the file system. Optionally, the step of capturing metadata includes capturing metadata indicative of a particular user executing the at least one file system operation, and the step of executing a set of remediation actions includes altering permissions associated with the particular user.

In a particular method, the step of processing the event includes creating and/or updating a derivative data set based on the event. The derivative data set is derived from the data of the remote data storage system associated with the remote file system. The method further includes performing data analytics on the derivative data set after the derivative data set has been updated. Optionally, the step of processing the event includes performing data analytics on the event itself.

In one example method, the step of executing a set of remediation actions includes pushing a control message to the remote data storage system. The control message indicates a set of file system operations to be executed on objects of the remote file system by the remote data storage system.

Example methods operate on a continuous basis, collecting additional events. Each event of the additional events is indicative of at least one additional file system operation executed on a data object of the remote file system stored on the remote data storage system. The method additionally includes storing the event and the additional events in an event database and providing a client associated with the remote file storage system access to the event database.

Example methods also facilitate data governance of data sources stored on third-party storage systems, remote with respect to both a client's site and the data governance site. In one method, the step of establishing a connection with the remote data storage system includes establishing a connection with a third party cloud service provider separate from the cloud-based data governance system.

An example cloud-based data governance system is also disclosed. The cloud-based data governance system includes a processing unit, a network adapter, and memory for storing data and code. The processing unit is configured to execute the code to impart functionality to the system. The network adapter is electrically coupled to establish a connection with a remote data storage system associated with a remote file system over a wide-area network (WAN).

The code includes an event collection interface, a data governance service, and an enforcement service. The event collection interface is configured to capture an event from the remote data storage system. The event is indicative of at least one file system operation executed on a data object of the remote file system stored on the remote data storage system. The data governance service is configured to receive the event from the event collection interface and to process the event to determine whether the at least one file system operation conflicts with a governance policy of the data governance system. The enforcement service is configured to execute a set of remediation actions, if the at least one file system operation does conflict with the governance policy.

In a particular example embodiment, the event collection interface is configured to deploy an event collection service to the remote file storage system. The event collection service is operative to detect file system operations executed on data objects of the remote file system stored on the remote data storage system and to generate events indicative of the file system operations. The event collection service then pushes the events to the data governance system. The event collection interface is configured to receive the events from the remote data storage system via the event collection service. Optionally, the event collection interface can periodically poll the event collection service for the events.

In an example embodiment, the event collection interface is further configured to receive a metadata snapshot of the remote data storage system. The metadata snapshot is indicative of the remote file system, and the data governance service is further configured to generate a derivative data set based on the metadata snapshot. The event collection interface is configured to capture metadata associated with file system operation(s) and/or data object(s) associated with captured event(s). The data governance service is additionally configured to update the derivative data set based on the captured event(s) and to perform data analytics on the updated derivative data set.

The enforcement module is additionally configured to push one or more control messages to the remote data storage system, if a data governance policy is violated. The control message(s) indicate a set of file system operations to be executed on objects of the file system on the remote data storage system. As a non-limiting example, the event collection interface can be configured to capture metadata indicative of a particular user executing the file system operation, and the set of remediation actions can include altering permissions associated with the particular user.

The system can further include an event database operative to store records of the captured events. The event collection interface is configured to collect additional events and store records of the additional events in the database. Each event of the additional events is indicative of at least one additional file system operation executed on a data object of the remote file system stored on the remote data storage system. Events can also be generated by monitoring update events associated with other data source types (e.g., Egnyte Connect, SharePoint, Windows Server, etc.) associated with other subsystems (e.g., file systems, links, permissions, etc.) that are present. Optionally, a client interface is configured to provide a client associated with the remote file system access to the event database. As another option, the data governance service is additionally configured to perform batch data analysis functions on a subset of the records of the database. As another option, the data governance service can be additionally configured to perform data analytics on the individual events.

In a particular embodiment, the remote computer system is a third party cloud service provider.

Methods that can be implemented, for example, in a local data storage system are also disclosed. An example method for utilizing cloud-based data governance services includes capturing an event indicative of a file system operation performed on a data object stored in the local data storage system. The method additionally includes establishing a connection with a remote cloud-based data governance system over a wide-area network (WAN) and providing the event to the data governance system. Provision of the event facilitates a determination of whether the event conflicts with a data governance policy stored on the data governance system. The method additionally includes executing a set of remediation actions on the local data storage system responsive to one or more communications from the data governance system, if the data governance system determines that the event conflicts with a data governance policy stored on the data governance system.

In a particular example method, the step of capturing an event includes deploying a plurality of data monitors. Each of the plurality of data monitors is associated with one of a plurality of different data source types, and each of the data monitors is operative to detect file system operations executed on data objects of the associated data source type. The data monitors then generate events indicative of the file system operations, and push the events to the data governance system.

Example methods of capturing/generating events are disclosed. In one example method the step of generating events includes scanning at least one of the data source types at different times. In another example method, the step of generating an event includes registering for callbacks from an application associated with at least one of the data source types. In yet another example method, the step of generating an event includes intercepting and filtering events from at least one of the data source types. Optionally, the steps of intercepting and filtering events from the at least one data source type includes installing an agent on-site with the local data storage system, the agent being configured to intercept and filter the events. The step of generating an event can include capturing metadata associated with the file system operation and/or the data object. In a particular example method, the step of capturing metadata includes capturing metadata identifying a particular user performing the file system operation on the data object. These example methods of capturing/generating events, as well as others, can be used individually or in any combination with one another, as the needs of a particular application might dictate.

In an example method, the step of providing the event to the data governance system includes providing metadata of a file system associated with the local data storage system to facilitate the creation or updating of a derivative data set by the data governance system. The step of providing the event to the data governance system can also include providing at least a portion of the data object associated with the event to facilitate the creation or updating of a derivative data set by the data governance system.

In an example method, the step of executing a set of remediation actions includes receiving one or more control messages indicating the set of remediation actions to be executed on the local data storage system. In a particular example method the step of executing a set of remediation actions on the local data storage system includes altering permissions associated with a particular user identified by an event.

A local data storage system is also disclosed. The local data storage system includes a processing unit configured to execute code, a network adapter electrically coupled to establish a connection with a remote cloud-based data governance system over a wide-area network (WAN), and memory. The memory stores data and the code. The data and the code include an event collection service, a data governance interface, and an enforcement module. The event collection service is configured to capture an event, which is indicative of a file system operation performed on a data object of the local data storage system. The data governance interface is configured to provide information associated with the event to the data governance system. The enforcement module is responsive to communications from the data governance system and is operative to execute a set of remediation actions on the local data storage system, if the data governance system determines that the event creates a conflict with a data governance policy stored on the data governance system.

In an example system, the event collection service includes a plurality of data monitors. Each of the plurality of data monitors is associated with one of a plurality of different data source types. Each data monitor is also operative to detect file system operations executed on an associated data source of the associated type, to generate events indicative of the file system operations, and push the events to the data governance system.

Various example data monitor functions are disclosed. As one example, at least one of the data monitors is configured to scan the associated data source at different times in order to detect the file system operations. As another example, at least one of the data monitors is configured to register for callbacks from an application associated with the associated data source type in order to detect the file system operations. As yet another example, at least one of the data monitors is configured to intercept and filter events related to the associated data source in order to detect the file system operations. As yet another example, at least one of the data monitors is configured to install an agent on the particular data source, the agent being configured to intercept and filter the events. The data monitors can be additionally configured to capture metadata associated with one or both of the file system operation and the data object. In an even more detailed example, the metadata is indicative of a particular user performing the file system operation on the data object. Any or all of the disclosed data monitor functions can be used in any combination with each other or with other data monitor functions depending on the needs of a particular system.

In an example system, the information associated with the event, which is provided to the data governance system by the data governance interface, includes metadata of a file system associated with the data object to facilitate the creation or updating of a derivative data set by the data governance system. Optionally, the information associated with the event includes at least a portion of the data object to facilitate the creation or updating of the derivative data set by the data governance system.

An example system includes remediation capabilities. The data governance interface is configured to receive one or more control messages indicating a set of remediation actions to be executed on the local file storage system. The enforcement module is configured to execute the set of remediation actions responsive to the one or more control messages. In a particular example embodiment, the remediation actions include altering permissions associated with a particular user identified by an event.

An example event collection system is also disclosed. The example event collection system is deployable on a file storage system and includes a processor, a network adapter, and memory. The processor is configured to execute code. The network adapter is electrically coupled to establish a connection to a data governance service over a wide-area network (WAN). The data governance service is located remotely from the event collection system. The memory provides storage for data and code. The data and code include a source connector routine and a data governance interface. The source connector routine is configured to monitor a corresponding particular data source on the file storage system and to generate an event responsive to a file system operation being executed on a data object associated with the particular data source. The event is indicative of the file system operation. The data governance interface is configured to push the event to the data governance service.

BRIEF DESCRIPTION OF THE DRAWINGS

The present invention is described with reference to the following drawings, wherein like reference numbers denote substantially similar elements:

FIG. 10C is data flow diagram showing a method for updating derivative data sets stored on the data governance system of FIG. 1;

DETAILED DESCRIPTION

The present invention overcomes the problems associated with the prior art, by providing a cloud-based data governance system hosted on a remote computer system with respect to the data source being governed. The data governance system provides data governance services, including data analytics, for data sources hosted on a local file system (e.g., a client site) or a remote, cloud-based storage system. The data governance system deploys event collection software to the local file system, to collect events generated in response to access, modification, and/or other operations executed on data sources of the local file system, as well as metadata and content. The data governance system also utilizes publicly available application programming interfaces (APIs) to collect access, modification, and/or other events from the cloud-based storage system. The data governance system analyzes the events in order to detect risks, threats, suspicious behavior, or any condition that violates an existing data governance policy, and utilizes the event collection software and APIs to send remediation operations to the local file system and the cloud-based storage system, respectively, in order to provide data security.

In the following description, numerous specific details are set forth (e.g., data types, event types, protocols, etc.) in order to provide a thorough understanding of the invention. Those skilled in the art will recognize, however, that the invention may be practiced apart from these specific details. In other instances, details of well-known cloud computing practices (e.g., virtualization, load balancing, etc.) and components have been omitted, so as not to unnecessarily obscure the present invention.

Figure 1:
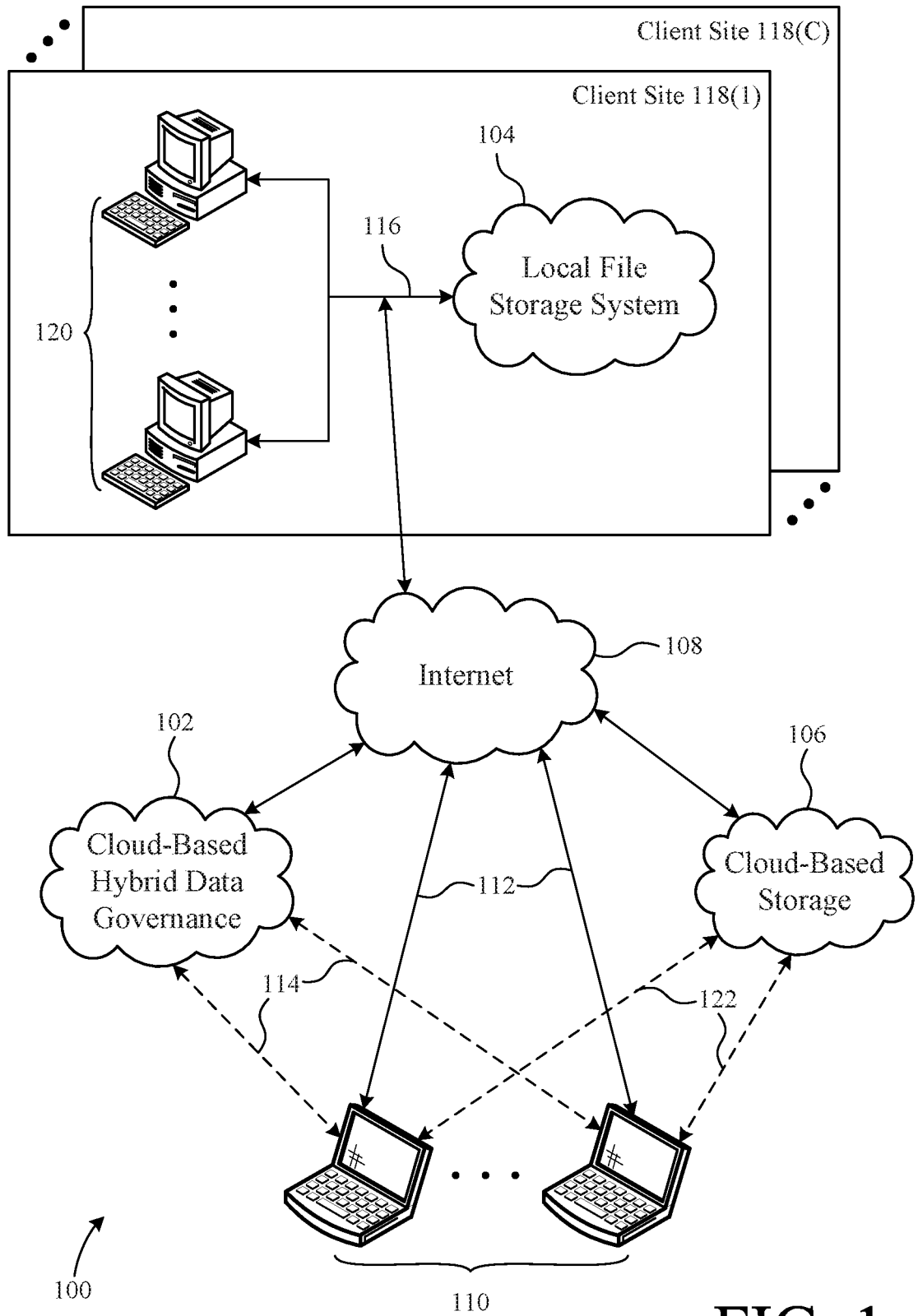
FIG. 1 is a diagram showing an example cloud-based data governance system.

FIG. 1 is a diagram showing an example cloud computing system 100 that includes a cloud-based, hybrid data governance system 102, a local file storage system 104, and a cloud-based storage server 106, all interconnected via the Internet 108. Data governance system 102 provides visibility to data access and modification events occurring on local file storage system 104 and data storage server 106. Data governance system 102 can be accessed by remote users logged onto remote clients 110 via Internet connections 112 or alternative connections (e.g. dial-up connections) 114. Remote clients 110 are machines (e.g. laptops, smart phones, etc.) with sufficient credentials to view data indicative of file system operations that are executed on data objects stored on local file storage system 104 and storage server 106. Remote users can also utilize remote clients 110 to view and/or change governance policies stored on data governance system 102.

Local file storage system 104 can be hosted, for example, on a network-attached storage (NAS) device (FIG. 2) on a local network 116 located at a client site 118(1). Additional client sites 118(2-C) host additional local file storage systems. Each of client sites 118(1-C) can be associated with the same or different cloud clients, as data governance system 102 is capable of providing governance services to any number of clients at any number of different locations. Local users can utilize local clients 120 to access and/or modify data objects stored on local file storage system 104 and also, with proper credentials, view and/or change governance policies stored on data governance system 102. In the example embodiment, at least a portion of local file storage system 104 is bi-directionally synchronized with storage server 106. In alternate embodiments, local file storage system 104 and storage server 106 can operate completely independently of one another. Storage server 106 is a cloud-based application for storing and accessing remote data objects. Remote clients 110 can access storage server 106 via Internet connections 112 or alternative connections 122, in order to upload, download, view, or update data objects stored thereon. Optionally, local clients 120 can also access storage server 106 via local network 116 and Internet 108.

Figure 2:
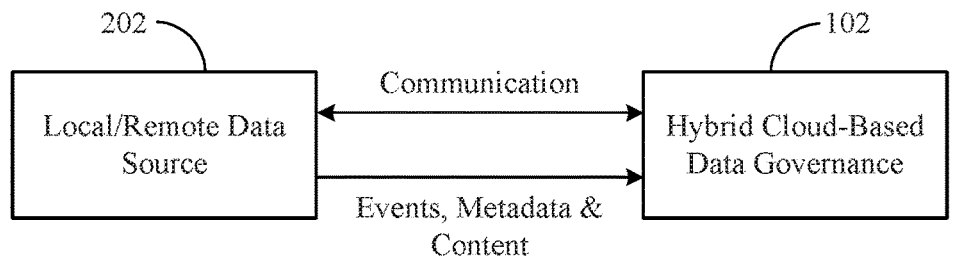
FIG. 2 is a relational diagram showing data transfer between a data governance system of FIG. 1 and a local/remote data source.

FIG. 2 is a relational diagram showing data transfer between data governance system 102 and a local/remote data source 202. Local/remote data source 202 is defined with respect to local file storage system 104 and can be a data source stored thereon or a data source located on a remote service, such as storage server 106. In either case, data source 202 is located remotely from data governance system 102 and communicates bi-directionally with data governance system 102. Data source 202 also sends events, metadata, and content to data governance system 102. Events include notifications that a data object on data source 202 was accessed or edited in some way. Metadata includes data representative of the file system, the file system directory, and permissions associated with file system objects on local file storage system 104 and/or cloud-based storage 106. Content includes data objects themselves, for example a WORD document, EXCEL file, etc. Data governance system 102 requests, receives, and processes the events, metadata, and content in order to provide data governance services for data source 202. Additionally, data governance system 102 sends control messages, including, but not limited to, commands to execute file system operations, to data source 202.

Figure 3A:
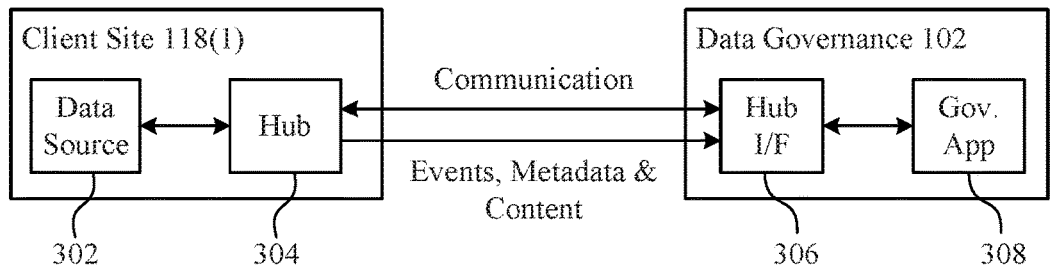
FIG. 3A shows an example of event communication between a client site and a remote data governance system of FIG. 1.
Figure 3B:
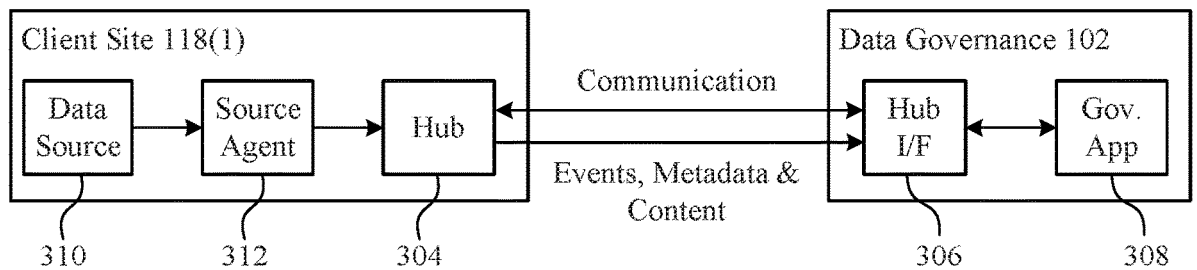
FIG. 3B shows another example of event communication between a client site and a remote data governance system of FIG. 1.
Figure 3C:
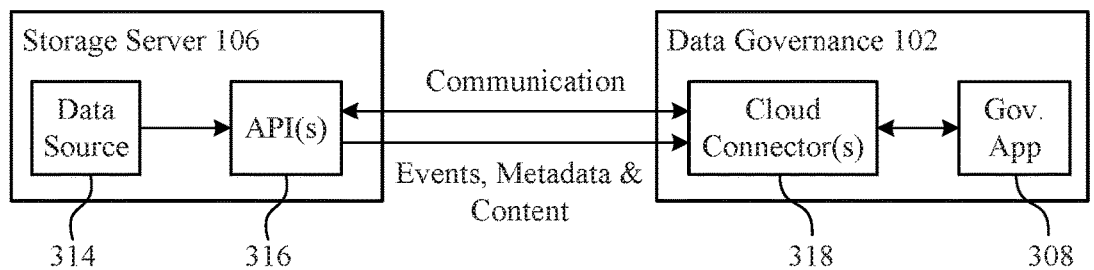
FIG. 3C shows yet another example of event communication between a client site and a remote data governance system of FIG. 1.

FIGS. 3A-3C are relational diagrams showing data transfer (event communication) between data governance system 102 and various data sources, each shown in a separate example system. FIG. 3A shows an example data source 302, hosted on client site 118(1), in communication with a hub 304. Hub 304 receives events, metadata, and content directly from data source 302. Hub 304 maintains an Internet connection with a hub interface 306 on data governance system 102 and sends the events, metadata, and content from data source 302 to hub interface 306 via the connection. Hub 304 and hub interface 306 each include specific networking protocols for communicating with one another over the Internet. Hub interface 306 forwards the data (e.g., events, metadata, and/or content) received from hub 304 onto a governance application 308, which performs data analytics and provides other data governance services based on the received data.

FIG. 3B shows an example data source 310 hosted on client site 118(1). Data source 310 is substantially similar to data source 302, except data source 310 and hub 304 cannot directly communicate with one another, at least for some event types. Therefore, a source agent 312 is also hosted on client site 118(1). Source agent 312 is a software module that provides an interface between data source 310 and hub 304. It should be noted that although source agent 312 is shown separately from data source 310, in reality source agent 312 could be installed directly onto data source 310. Hub 304, hub interface 306 and governance application 308 function as described with respect to FIG. 3A.

FIG. 3C shows an example data source 314 hosted on storage server 106. Data source 314 utilizes one or more application programming interfaces (APIs) 316 to facilitate communication with its clients via the Internet 108. Cloud connectors 318 utilizes APIs 316 to facilitate communication between data governance system 102 and storage server 106. APIs 316 include publicly available protocols for communicating with remote services over the Internet. Cloud connectors 318 utilize APIs 316 to retrieve events, metadata, and content from storage server 106 for data governance system 102. Cloud connectors 318 additionally include software for generating events based on the data retrieved from storage server 106. Cloud connectors 318 then forward events, metadata, and content received via APIs 316 onto governance application 308.

Figure 4:
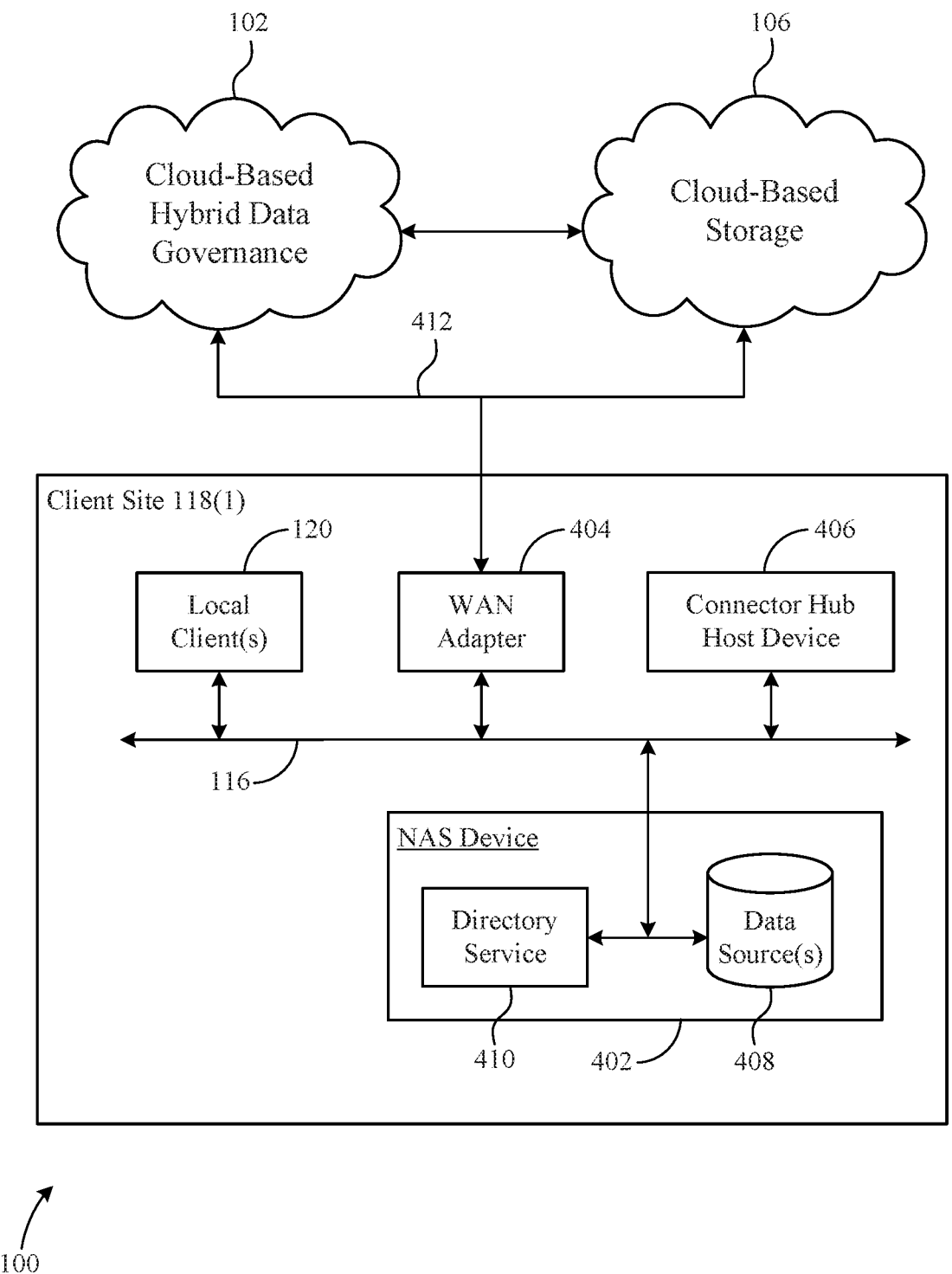
FIG. 4 is a diagram showing the client site of FIG. 1 in greater detail.

FIG. 4 is a block diagram showing communication between various components of cloud computing system 100, including client site 118(1), which is shown in greater detail. Client site 118(1) includes a network-attached storage (NAS) device 402, a WAN adapter 404, a connector hub host device 406, and local clients 120, all interconnected via local network 116. NAS device 402 is a storage device connected to local network 116 and accessible by other components connected to local network 116. NAS device 402 hosts data source(s) 408, and a directory service 410 runs on a separate, dedicated server. Data sources 408 include file system objects (e.g. files, metadata, applications, etc.) constituting a local file system that can be accessed by local clients 120 for viewing, editing, utilization, etc. Directory service 410 includes user permissions and lookup tables to allow local clients 120 with sufficient credentials to locate and access available data objects included in data sources 408. WAN adapter 404 is a network device that provides a connection to a wide-area network, which, in this example, is the Internet 108 (omitted from FIG. 4 for clarity). Components connected to local network 116 can access data governance system 102 and storage server 106 via an Internet connection 412 provided by WAN adapter 404. Local clients 120 can utilize Internet connection 412 to upload and/or download data objects from storage server 106.

Figure 5:
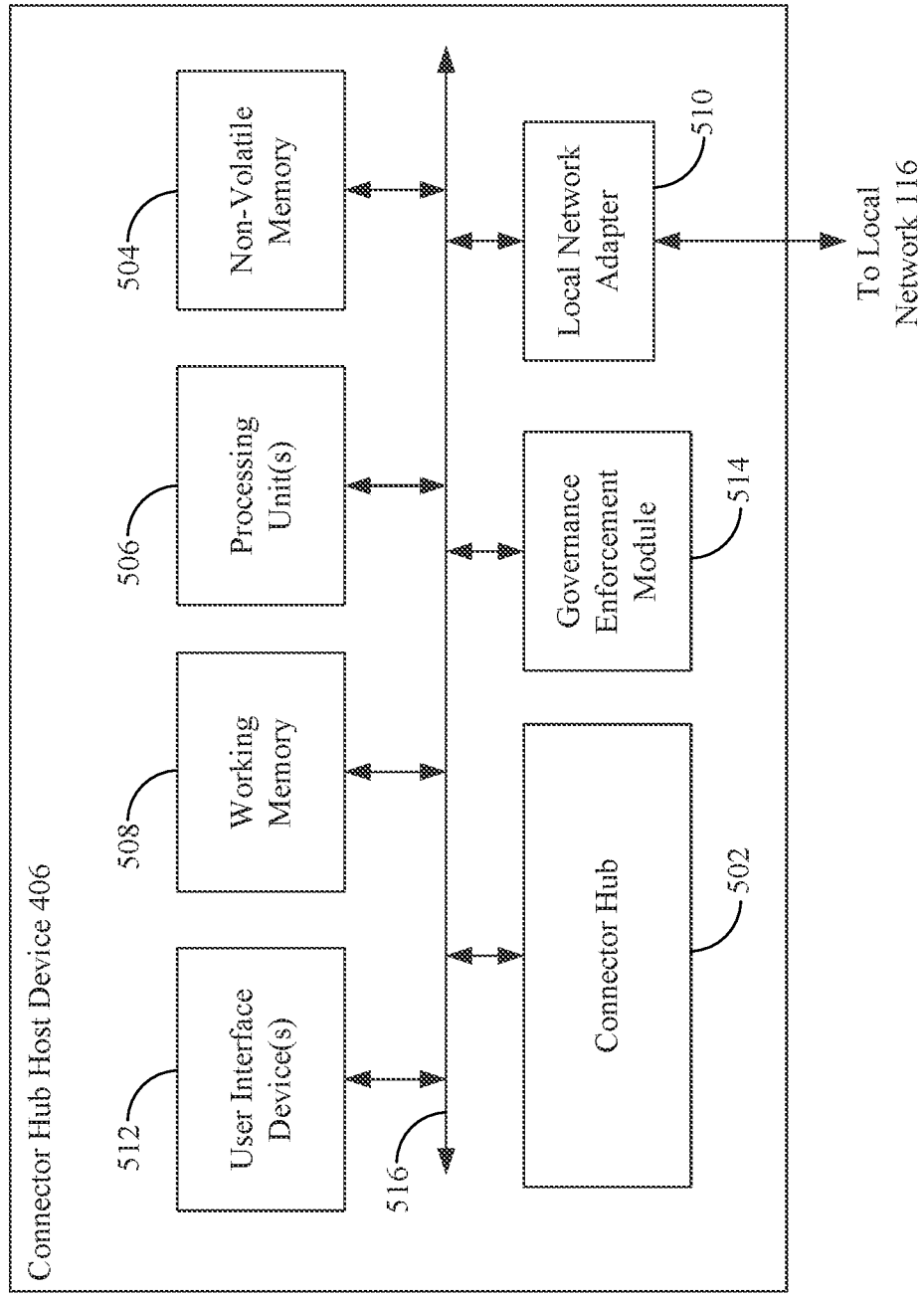
FIG. 5 is a block diagram showing the connector hub host device of FIG. 4 in greater detail.

Connector hub host device 406 is a device that hosts a software-based connector hub (FIG. 5). In the example embodiment, connector hub host device 406 is a server hosting virtualization software for running virtual machines to host various components of the connector hub. The connector hub monitors data sources 408 including directory service 410 to detect access and modification to data objects by local clients 120. The connector hub generates events based on the access and modifications detected, and connector hub host device 406 sends the events to data governance system 102 via WAN adapter 404 and Internet connection 412. Additionally data governance system 102 receives and/or pulls access and modification events from storage server 106, resulting from access and modification by local clients 120 or remote clients 110 (FIG. 1).

FIG. 5 is a block diagram showing connector hub host device 406, including a connector hub 502, in greater detail. Connector hub host device 406 is a server for hosting virtualized machines and includes non-volatile memory 504, one or more processing units 506, working memory 508, a local network adapter 510, one or more user interface devices 512, connector hub 502, and a governance enforcement module 514, all interconnected via a system bus 516. Non-volatile memory 504 is a data storage device that stores data objects, such as files and software, to be accessed by other elements of connector hub host device 406 and local network 116. Non-volatile memory 504 can include several different storage devices and types, including hard disk drives, solid state drives, read-only memory (ROM), etc. distributed across local network 116. Processing unit(s) 506 transfer code from non-volatile memory 504 into working memory 508 and execute the code to impart functionality to various components of connector hub host device 406. For example, working memory 508 stores code, such as software modules, that when executed provides the described functionality of connector hub 502. Local network adapter 510 provides a network connection between connector hub host device 406 and local network 116 and, therefore, WAN adapter 404 and the Internet 108 (FIGS. 1 and 4). User interface device(s) 512 (e.g. keyboards, mice, etc.) enable local IT personnel to access connector hub host device 406, e.g., for firmware upgrades, software upgrades, etc.

Connector hub 502 is a framework of virtualized nodes for generating data access and modification events and sending the events to data governance system 102. Connector hub 502 monitors data sources 408 and directory service 410 (FIG. 4) and generates events responsive to and indicative of access, modifications, and other operations executed on directory service 410 and the local file system stored on data sources 408. These events are sent to data governance system 102 via local network adapter 510 and WAN adapter 404, in order to be processed and stored for data governance analytics and visibility purposes. Governance enforcement module 514 is a virtualized software module that receives control messages from data governance system 102. Governance enforcement module 514 can access and alter data sources 408 and directory service 410, responsive to receiving control messages from data governance system 102, in order to quarantine suspicious files or alter permissions for a user engaging in suspicious activities, by way of non-limiting example. Together, connector hub 502 and governance enforcement module 514 constitute a framework for collecting events from and enforcing data governance policies on the local file system.

Figure 6:
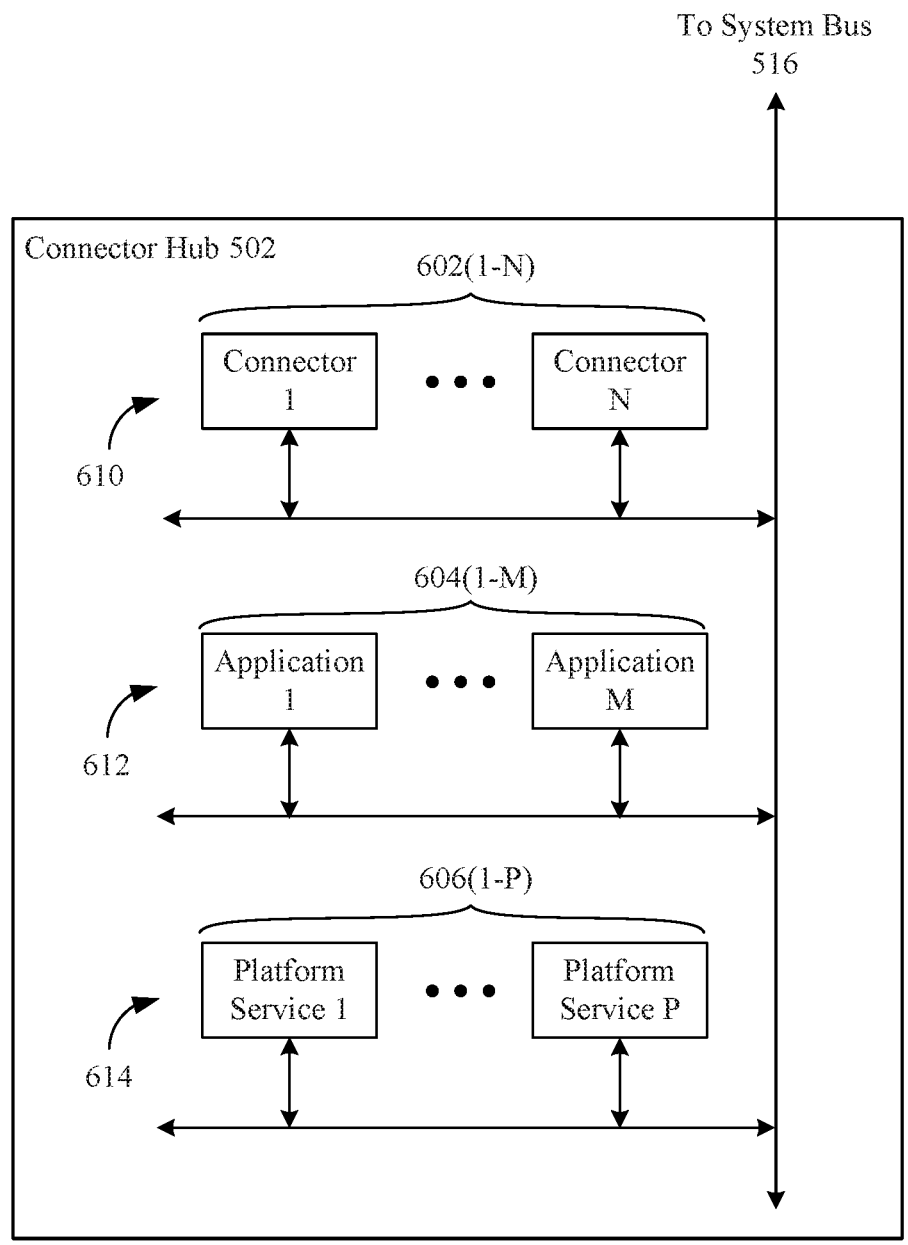
FIG. 6 is a block diagram showing various aspects of the connector hub of FIG. 5.

FIG. 6 is a block diagram showing various components of connector hub 502. Connector hub 502 includes a set of connectors 602(1-N), a set of applications 604(1-M), and a set of platform services 606(1-P). Connectors 602, applications 604, and platform services 606 are all software modules running in working memory 508 on a hub system layer. Connectors 602 are included in a connector layer 610, and each of connectors 602 monitor a specific data source, where a data source includes a subset of data sources 408 that corresponds to a particular data type and/or program. For example, a source can be word processing software, such as Microsoft Word, and associated data, such as documents, settings, system files, etc. Connectors 602 monitor the corresponding sources and generate events whenever the respective sources are accessed or modified. These events provide data governance system 102 with information about the file system object, the file system operation executed thereon, and the user that executed the operation. Additionally, connectors 602 can send copies of content (e.g., part or all of a file system object) for further analysis, when such further analysis is suggested by a data governance policy.

Applications 604 are included in an application layer 612, and each of applications 604 provide a separate service for analyzing events created by connectors 602. Applications 604 provide services that can be utilized, for example, to determine that a file system object contains malware or that a user is downloading sensitive material, based on an event, multiple events, or the file system objects themselves. More specific examples of applications 604(1-M) will be provided herein with reference to subsequent drawings.

Platform services 606 are included in a platform layer 614, and each of platform services 606 provides connectors 602 and applications 604 with underlying, support functionality, such as communication with hardware devices. For example, platform services 606 allow the other components of connector hub 502 to communicate with one another and with devices hosted on connector hub host device 406, such as local network adapter 510.

Connector layer 610, application layer 612, and platform layer 614 constitute a layered, software framework that is more fully described with reference to FIG. 13 below.

Figure 7:
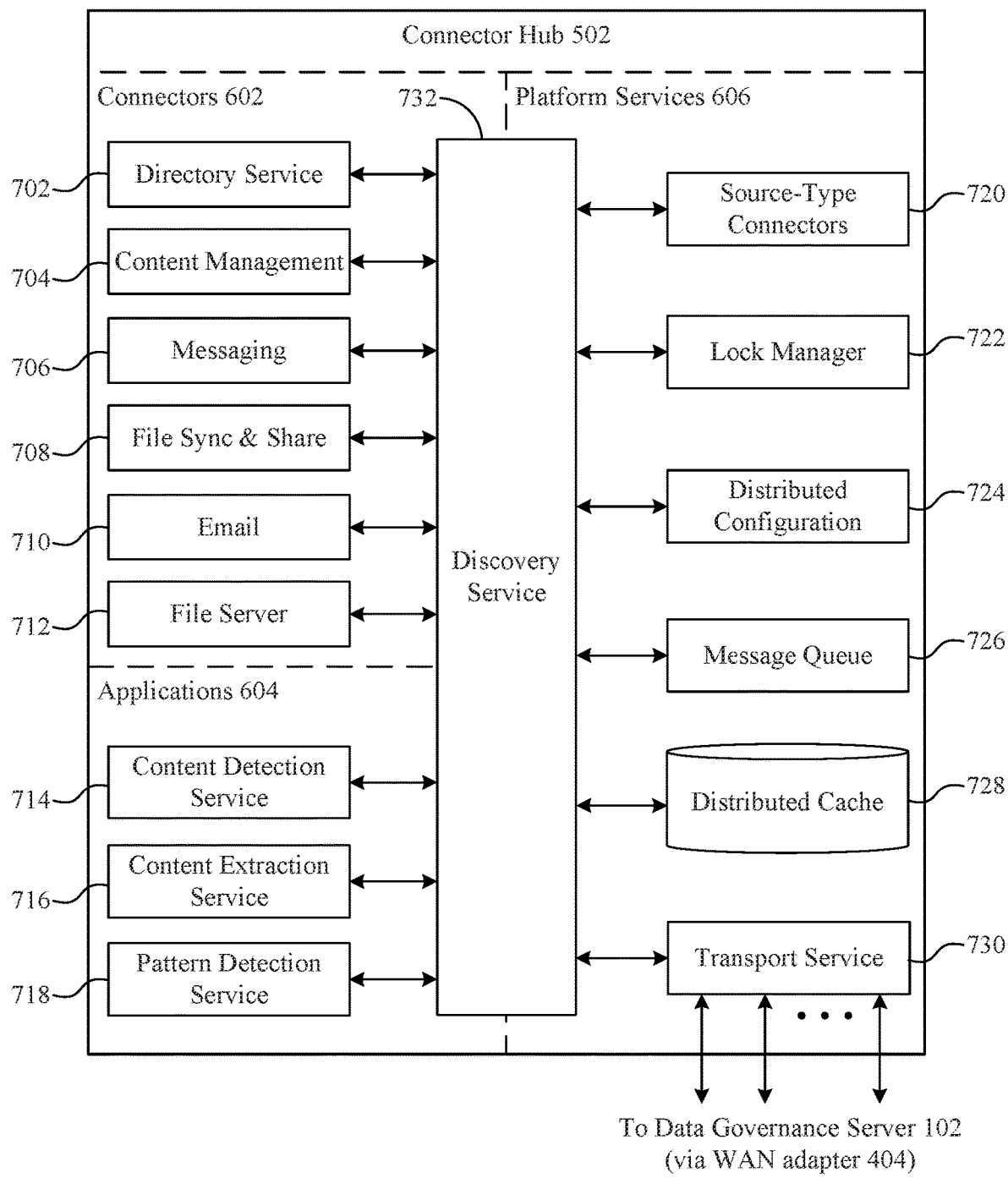
FIG. 7 is a block diagram showing the connector hub of FIG. 5 in even greater detail, including specific examples of the connectors, applications, and platform services of FIG. 6.

FIG. 7 is a block diagram showing connector hub 502 in even greater detail, including specific examples of connectors 602, applications 604, and platform services 606. Connectors 602 include directory service connector(s) 702, content management connector(s) 704, messaging connector(s) 706, file sync & share connector(s) 708, email connector(s) 710, and file server connector(s) 712. Directory service connector(s) 702 monitor directory service 410 for changes made thereto. For example, if one of local clients 120 is disconnected from local network 116, a directory service connector 702 will generate an event indicative of the corresponding change to the data contained in directory service 410. Content management connector(s) 704 monitor content management software, such as Microsoft Sharepoint, EMC Documentum, etc., and associated data. Messaging connector(s) 706 monitor messaging software, such as Twitter, Yahoo Instant Messenger, Slack, etc., and associated data. File sync and share connector(s) 708 monitor file sharing software, such as Egnyte Connect, Box, Dropbox, etc., and associated data. Email connector(s) 710 monitor email software, such as Microsoft Exchange, Google Gmail, etc., and associated data. File server connector(s) 712 monitor file server software, such as Netapp, EMC, Dell, etc., and associated data.

Applications 604 include content extraction service(s) 714, content detection service(s) 716, and pattern detection service(s) 718. Content extraction service(s) 714 analyze data and content to extract data into a text file or a PDF. For example, a content extraction service 714 converts software code into a parse-able and query-able text file, such as a notepad document. Content detection service(s) 716 analyze the extracted content to determine parts, sub-parts, and MIME types of the content. For example, a content detection service 716 might analyze the extracted notepad document to determine that the underlying content is an HTML document with Java Plug-ins. Pattern detection service(s) 718 analyze the extracted notepad document to detect predefined patterns indicative of relevant issues (e.g., security, privacy, and so on) from a data governance perspective. For example, a predefined pattern might include numbers grouped in a ###-##-#### pattern, which could be indicative of an employee's social security number.

Platform services 606 include source-type connectors 720, a lock manager 722, a distributed configuration 724, a message queue 726, a distributed cache 728, a transport service 730, and a discovery service 732. Source-type connectors 720 are generic connectors by source type for retrieving additional metadata from sources such as file systems. Source-type connectors 720 can, for example, retrieve file attributes related to specific events. Lock manager 722 is a service that ensures sequential access to critical resources or locks critical resources for performing operations, such as configuration changes across nodes. Distributed configuration 724 is a resilient service that shares configuration data, such as source credentials, securely across nodes. Message queue 726 is a resilient queue used to push data and events between the various nodes. For example, directory service connector 702 can use message queue 726 to provide data or an event to content extraction service 716 for analysis. Distributed cache 728 is distributed memory used for storing frequently looked up data, such as mapping of security identifiers to user information. Transport service 730 manages a pool of always-on, bi-directional connections, such as Web Socket connections, to data governance system 102. Discovery service 732 allows each of connectors 602, applications 604, and platform services 606 to dynamically discover each other across the various nodes. It should be noted that, in alternate embodiments, any and all of connectors 602, applications 604, and platform services 606 can be hosted by data governance system 102, instead of connector hub 502, or be distributed between the two. Alternatively, any of connectors 602, applications 604, and platform services 606 can be replicated in data governance system 102, as is shown in FIG. 9 below.

Figure 8:
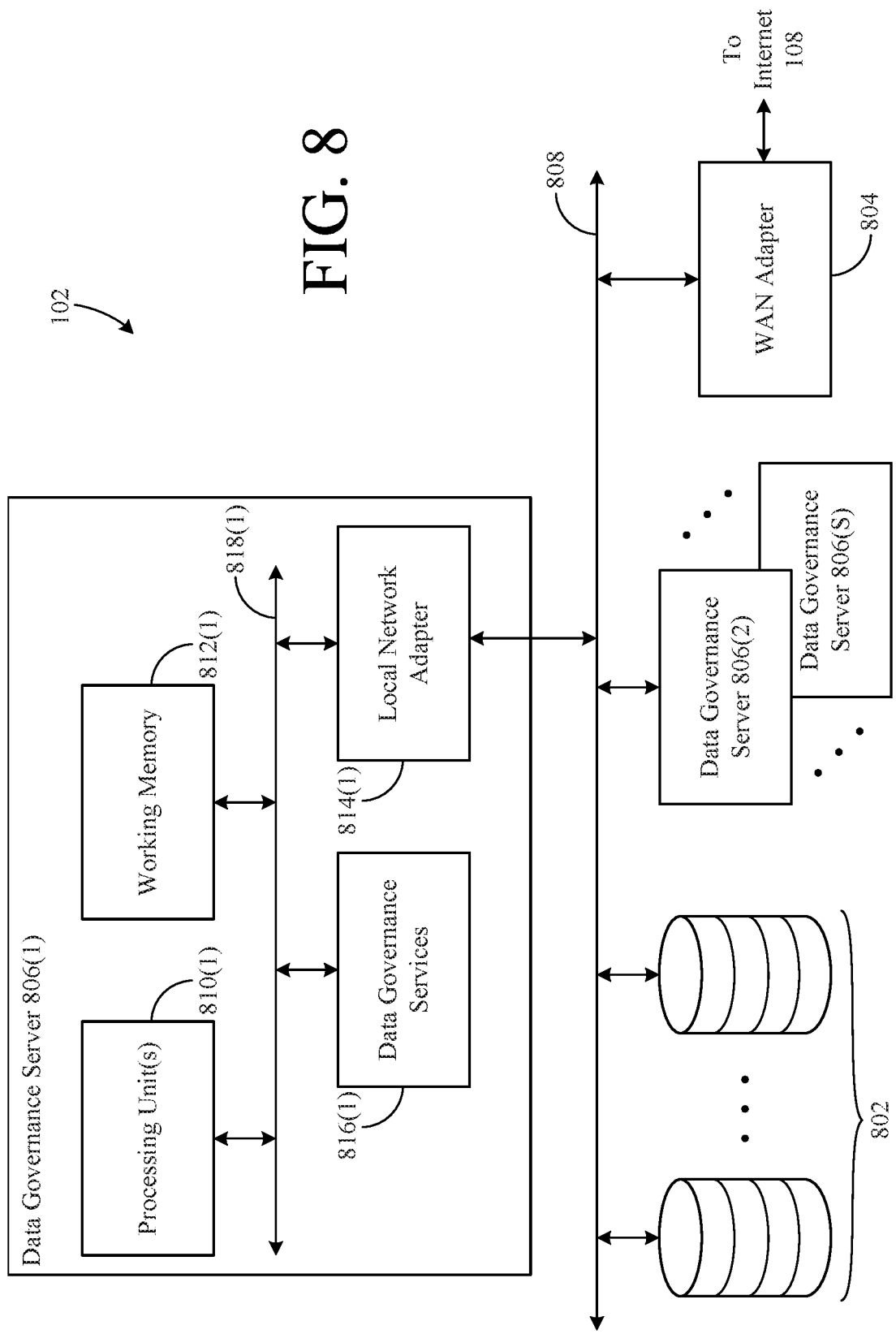
FIG. 8 is a block diagram showing the data governance system of FIG. 1 in greater detail.

FIG. 8 is a block diagram showing data governance system 102 in greater detail. Data governance system 102 is a cloud-based computer system including multi-tenant data storage devices 802, a WAN adapter 804, and data governance servers 806(1-S), all interconnected via a local network 808. Storage devices 802 are network attached storage devices for storing data associated with multiple different cloud clients. Storage devices 802 can provide the non-volatile data storage utilized by every other component of data governance system 102. WAN adapter 804 is a network adapter for establishing a connection to the Internet 108. Elements of data governance system 102 utilize WAN adapter 804 to communicate with remote systems, such as local file storage system 104 (e.g., connector hub 502) and storage server 106.

Data governance servers 806 provide data governance services for local file storage systems and cloud-based storage servers associated with various cloud clients. In the example embodiment, data governance server 806(1) provides data governance services for local file storage system 104 and storage server 106. Data governance server 806(1) includes one or more processing units 810(1), working memory 812(1), a local network adapter 814(1), and a data governance services module 816(1), all interconnected via an internal bus 818(1). Processing unit(s) 810(1) execute code transferred into working memory 812(1) from, for example, storage devices 802, to impart functionality to various components of data governance server 806(1). Working memory 812(1) can also cache frequently used code, such as network locations of storage devices 802, to be quickly accessed by the various components of data governance server 802(1). Local network adapter 814(1) provides a network connection between data governance server 806(1) and local network 808 and, therefore, WAN adapter 804, which provides a connection to the Internet 108. Data governance services 816(1) are various software services, running within working memory 812(1), for collecting and analyzing events that are received from connector hub 502. Data governance services 816(1) perform data analytics on events and file system metadata received from connector hub 502. Although only data governance server 806(1) is shown in detail, it should be understood that data governance server 806(1) is substantially similar to data governance servers 806(2-S), except that any of data governance servers 806 can correspond to different cloud clients and, therefore, can be configured differently to utilize different data, connectors, applications, network connections, etc.

Figure 9:
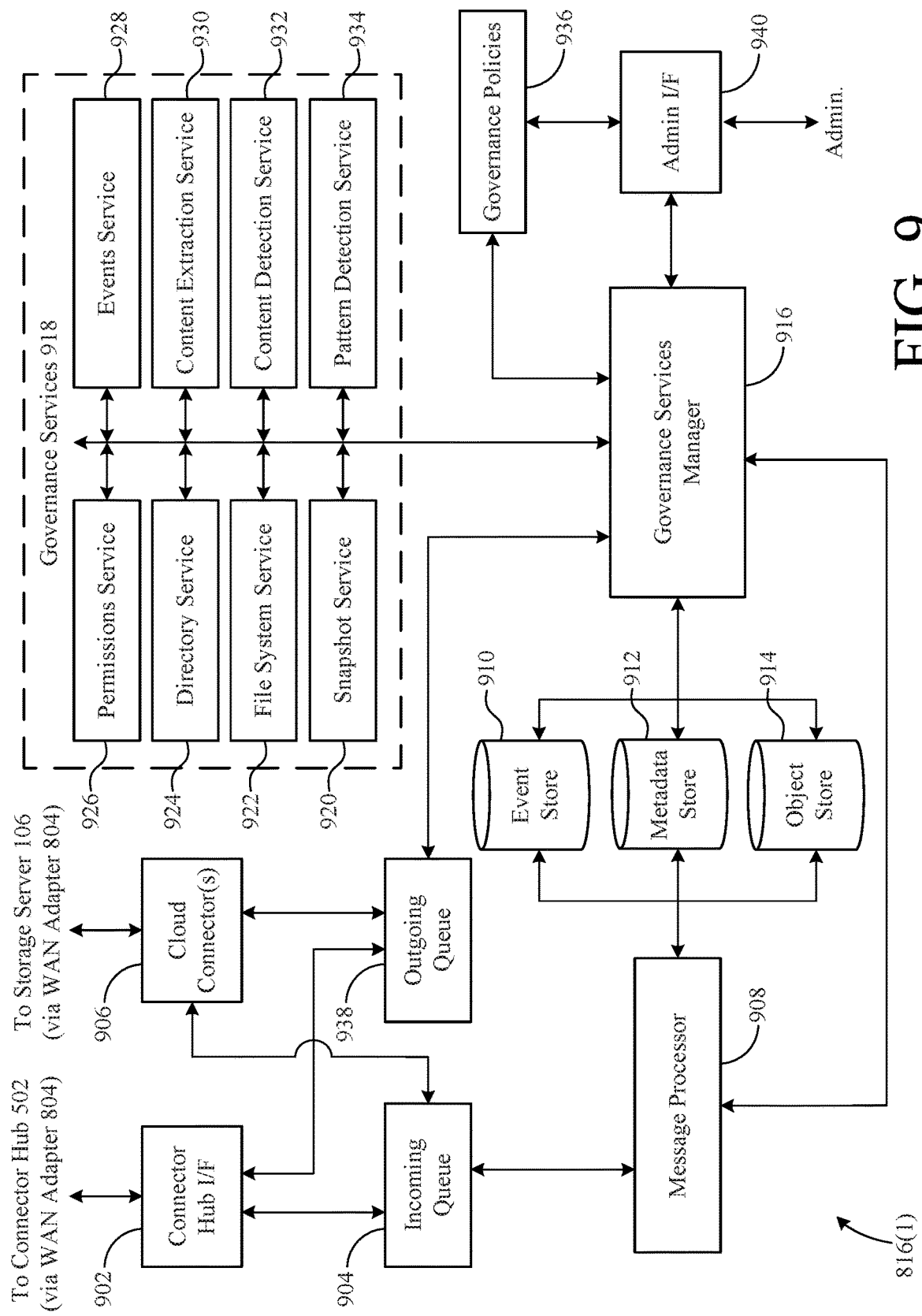
FIG. 9 is a block diagram showing aspects of the data governance services of FIG. 8 in greater detail.

FIG. 9 is a block diagram showing components of data governance services 816(1) in greater detail. Data governance services 816(1) perform several functions, including receiving and processing events, metadata, and content from local file storage system 104 and storage server 106, generating and updating a derivative data set, performing data analytics, providing visibility to data access and events, and providing control messages to local file storage system 104 and storage server 106.

Data governance services 816(1) receive events, metadata, and/or content from local file storage system 104 and/or storage server 106 via the Internet. A connector hub interface 902 receives messages containing events, metadata, or content from connector hub 502 and removes any protocol headers (e.g., Web Socket headers) before saving the messages in an incoming queue 904. Similarly, one or more cloud connectors 906, which are configured to communicate with cloud-based data sources by utilizing publicly available APIs, retrieve information from storage server 106, generates events based on the information, and stores the events in incoming queue 904. A message processor 908 reads the events from incoming queue 904 and determines whether the message constitutes an event, metadata, or content. Message processor 908 saves events in an event store 910, saves metadata in metadata store 912, and saves content in an object store 914. Whenever message processor 908 processes a message, it also notifies a governance services manager 916 that an event, metadata, or content has been received and processed. In response, governance services manager 916 uses events stored in events store 910 or metadata stored in metadata store 912 to generate (for the first time) or update a derivative data set, which includes metadata indicative of local file storage system 104 (or storage server 106).

Governance services manager 916 utilizes a set of governance services 918 to perform data processing and analytics on incoming events, metadata, and content, as well as the derivative data set stored in event store 910, metadata store 912, and/or object store 914. Governance services 918 include a snapshot service 920, a file system service 922, a directory service 924, a permissions service 926, an events service 928, a content extraction service 930, a content detection service 932, and a pattern detection service 934. Snapshot service 920 coordinates file system service 922, directory service 924, and permissions service 926, in order to capture metadata and edit the derivative data set on metadata store 912. Snapshot service 920 controls when (e.g. every 10 minutes) and how to capture metadata from local file storage system 102. File system service 922 selects file system data from the received metadata and generates/alters a cloned file system tree indicative of the file system on local file storage system 104 as part of the derivative data set. Directory service 924 selects directory data from the received metadata and generates/alters a cloned directory tree indicative of the directory tree on local file storage system 104 as part of the derivative data set. Permissions service 926 selects permissions data from the received metadata and generates/alters a cloned permissions tree indicative of the permissions tree on local file storage system 104 as part of the derivative data set. Events service 928 analyzes events stored in event store 910 in order to determine whether or not to modify the derivative data set stored in metadata store 912 or if additional metadata or content from local file storage system 104 is needed. If additional metadata or content is required, governance services manager 916 can request the necessary data from local file storage system 104, as will be described below. Together, services 920, 922, 924, 926, and 928 provide the functionality required to generate and/or update the entire derivative data set stored in metadata store 912. Content extraction service 930, content detection service 932, and pattern detection service 934 are substantially similar to content extraction service 714, content detection service 716, and pattern detection service 718, of connector hub 502.

Utilizing governance services 918, governance services manager 916 analyzes events on event store 910, the derivative data set on metadata store 912, and objects on object store 914, in view of a set of governance policies 936. Governance policies 936 include a vast set of predefined criteria including, but not limited to, security criteria, privacy criteria, definitions of suspicious and/or threatening activity and data, including patterns indicative of malicious code and system attackers, access criteria, and so on. Governance policies 936 also include remediation definitions, which provide governance services manager 916 with a procedure to follow in the event that events, metadata, or content indicate malicious behavior or code or a violation of any data governance policy. For example, governance policies 936 can contain virus definitions to be used by governance services manager 916 and pattern detection service 934 in order to detect viruses in compromised data objects stored in object store 914. Upon determining that a data object does contain a virus, governance services manager 916 consults governance policies 936 to determine how to proceed. Governance policies 936 might indicate that the infected data object should be deleted, quarantined, ignored, etc. Alternatively, governance policies 936 might simply indicate that a notification be sent to an administrator.

In response to the relevant procedure included in governance policies 936, governance services manager 916 will begin performing remediation actions. Governance services manager 916 generates control messages, including a list of file system operations to be executed on local file storage system 104 or storage server 106. Each of the file system operations includes, for example, a data object identifier and one of a set of potential operations, including move, delete, update, etc. Governance service manager 916 saves the control messages into an outgoing queue 938, which then forwards the messages to one of connector hub interface 902 or cloud connectors 906, based on the data object identifier. Connector hub interface 902 sends the control messages to local file storage system 104, which processes the control messages and performs the necessary file system operations. Cloud connectors 906 utilize cloud-based storage APIs to access storage server 106 and perform the necessary file system operations.

Additionally, data governance services 816(1) include an administrator interface 940, which allows the administrator to fine-tune the way in which data governance services 816(1) detect and respond to data security threats. Administrator interface 940 allows administrators associated with local file storage system 104 or storage server 106 to access event store 910, metadata store 912, and/or object store 914 in order to view data indicative of access or changes made to local file storage system 104 and/or storage server 106. Administrator interface 940 requests the data from governance services manager 916, which pulls the data and provides it to administrator interface 940. Administrator interface 940 provides the data to the administrator through a customizable graphical user interface (GUI), which is defined in governance policies 936. Through the GUI, the administrator can see, for example, what objects are being accessed by who and how frequently, as well as which objects have been changed and in what way. Administrator interface 940 also provides the administrator with options for updating governance policies 936, including setting remediation procedures, uploading custom content patterns, customizing the GUI, etc.

Figure 10A:
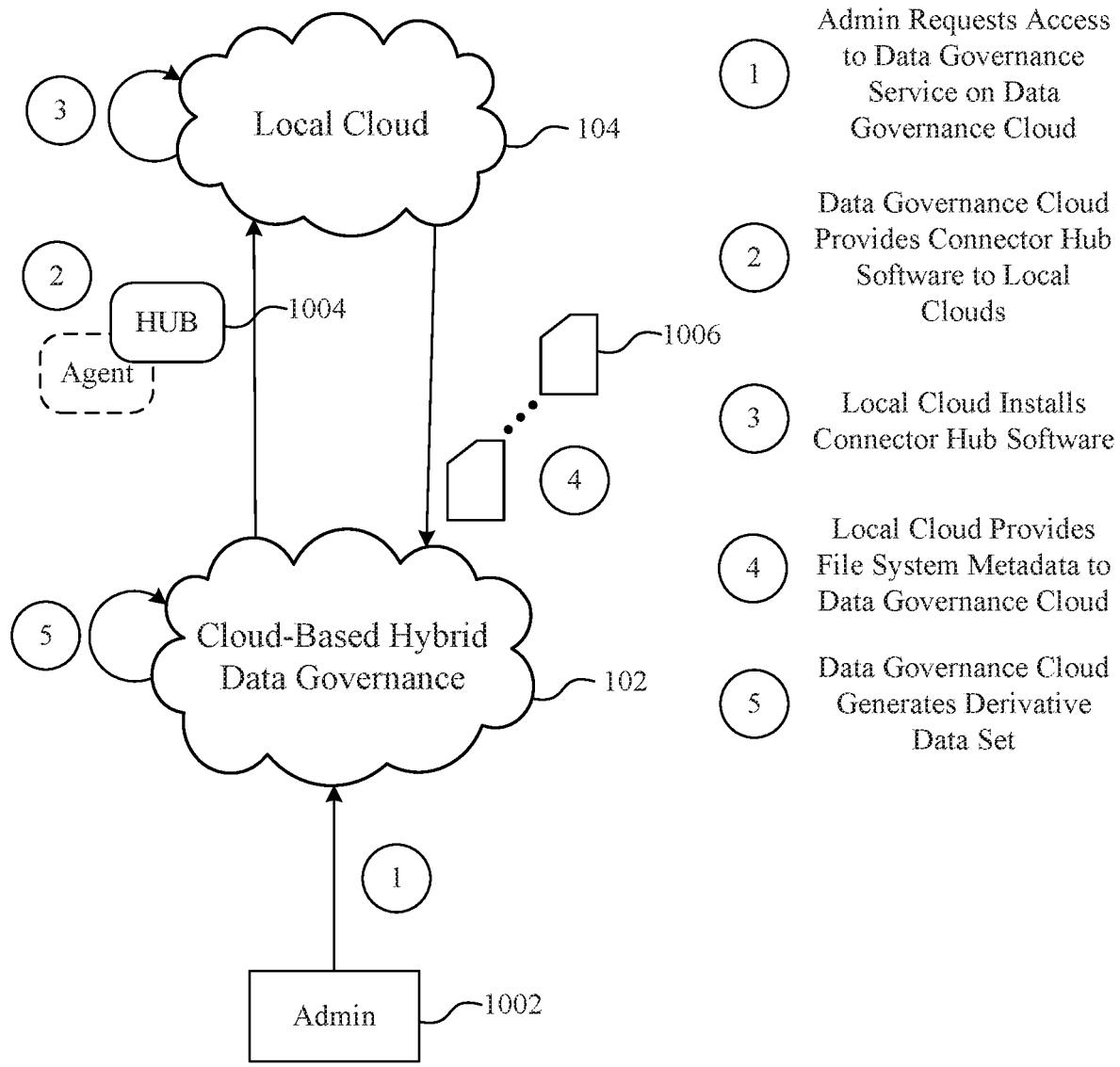
FIG. 10A is a data flow diagram showing a method for initially configuring the data governance system and the local file storage system of FIG. 1 for data governance services.

FIG. 10A is a data flow diagram showing a method for initially configuring data governance system 102 and local file storage system 104 for data governance services. First, during a step labeled (1), an administrator 1002 associated with local file storage system 104 requests data governance services from data governance system 102. In response, during a step labeled (2), data governance system 102 pushes connector hub software 1004 (including any additional agents needed for particular sources) to local file storage system 104. Upon receiving connector hub software 1004, local file storage system 104 installs the software onto an appropriate machine (e.g. connector hub host device 406), during a step labeled (3). Additionally, during a step labeled (4), local file storage system 104 provides a metadata snapshot 1006, indicative of the file system of local file storage system 104, to data governance system 102. Upon receiving metadata snapshot 1006, data governance system 102 generates a derivative data set indicative of local file storage system 104, during a step labeled (5).

Figure 10B:
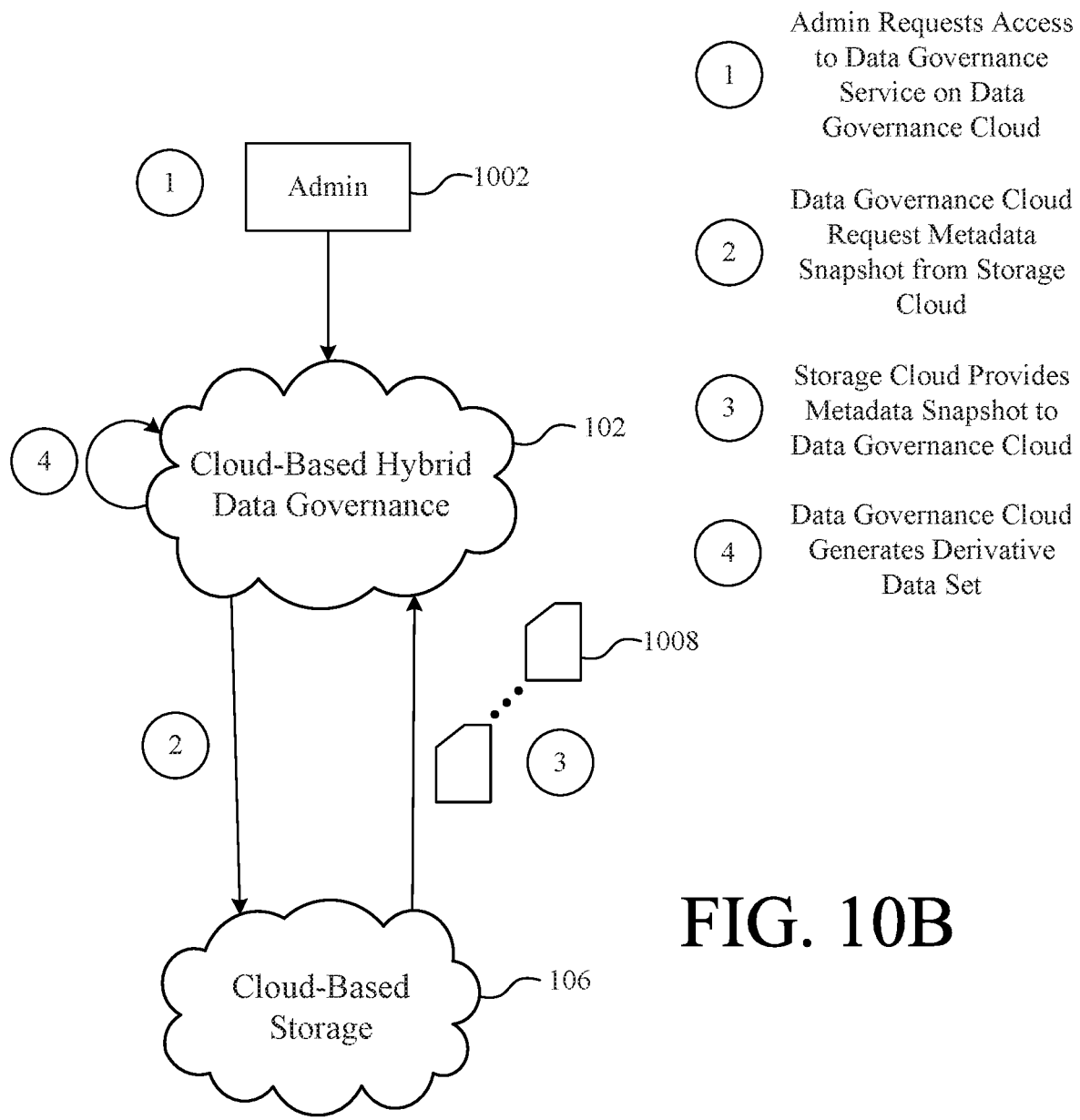
FIG. 10B is a data flow diagram showing a method for initially configuring the data governance system and the storage server of FIG. 1 for data governance services.

FIG. 10B is a data flow diagram showing a method for initially configuring data governance system 102 and storage server 106 for data governance services. First, during a step labeled (1), administrator 1002, also associated with storage server 106, request data governance services from data governance system 102. In response, data governance system 102 requests a metadata snapshot of storage server 106 (e.g., the files and directories associated with the client), during a step labeled (2). Upon receiving the request, storage server 106 provides a metadata snapshot 1008, indicative of the file system of the clients data on storage server 106, during a step labeled (3). Upon receiving metadata snapshot 1008, data governance system 102 generates a derivative data set indicative of storage server 106, during a step labeled (4).

FIG. 10C is data flow diagram showing a method for updating the derivative data sets stored on data governance system 102. During a step labeled (1a), changes are made to local file storage system 104. During another step labeled (1b), changes are also made to storage server 106. Responsive to the changes to local file storage system 104, during a step labeled (2a), local file storage system 104 provides events 1010, indicative of the changes made on local file storage system 104, to data governance system 102. Responsive to the changes to storage server 106, during another step labeled (2b), data governance system 102 retrieves events 1012, indicative of the changes to storage server 106, from storage server 106. Responsive to receiving events 1010 and 1012, data governance system 102 updates the derivative data sets indicative of local file storage system 104 and storage server 106, respectively, during a step labeled (3). It should be noted that local file storage system 104 and storage server 106 can provide additional metadata or content along with events 1010 and 1012. Additionally, events can be either pushed by local file storage system 104 and storage server 106 or pulled by data governance system 102, based on the preferences of the client, the configuration of the system, and the capabilities of storage server 106.

Events 1010 and 1012 are formatted as JSON objects as follows:

```
{
    "messageId" : "<alphanumeric random id>",
    "message" : { "object" : "<alphanumeric object id>",
        "action" : ["create" | "retrieve" | "update" |
        "delete" | ... | ... ],
        "username" : "<user_name>",
        "actionCreationTime": 12:34.05_11/31/2017
    }
}
``` wherein "messageID" is an alphanumeric identifier (e.g., corresponding to an event identifier, a random identifier, etc.), "object" is an alphanumeric identifier that corresponds to a particular object that was accessed/modified, "action" specifies a particular access or modification operation (e.g. a CRUD operation) executed on the particular object, "username" is the username corresponding to the user that executed the operation, and "actionCreationTime" is a timestamp specifying the date and time that the operation was executed on the object. The message can also include, for example, a Web Socket header added to the message (payload) by local file storage system 104 or storage server 106, if the event was sent via a Web Socket protocol.

Figure 11:
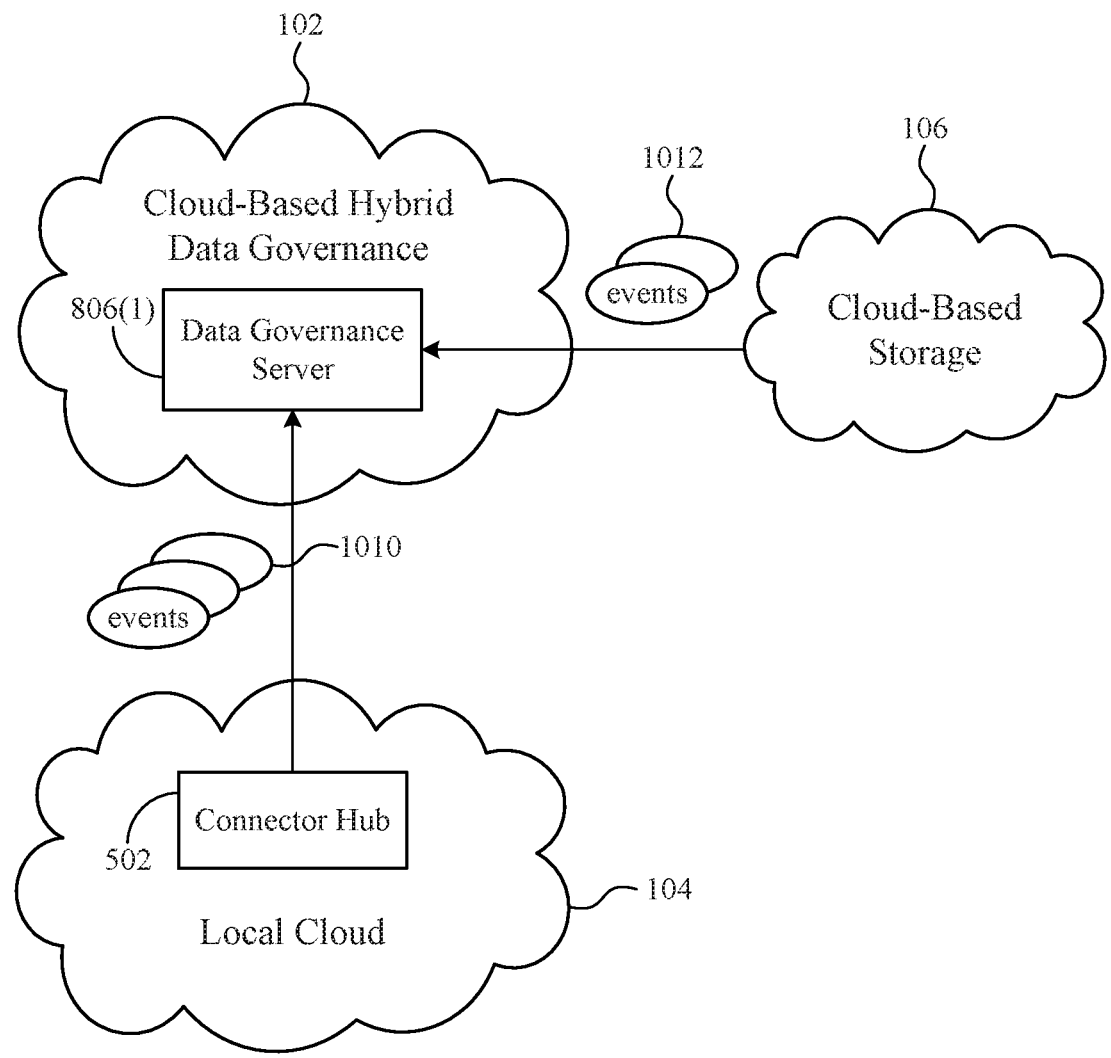
FIG. 11 is a data flow diagram showing a portion of the method of FIG. 10C in greater detail.

FIG. 11 is a data flow diagram showing a portion of the method of FIG. 10C in greater detail. Local file storage system 104 includes connector hub 502, which provides events 1010 to data governance system 102. Data governance system 102 includes data governance server 806(1), which receives events 1010 from local file storage system 104 and events 1012 from storage server 106. Storage server 106 does not include a connector hub, and data governance server 802(1) instead utilizes publicly available APIs to request and receive information indicative of events from storage server 106.

Figure 12:
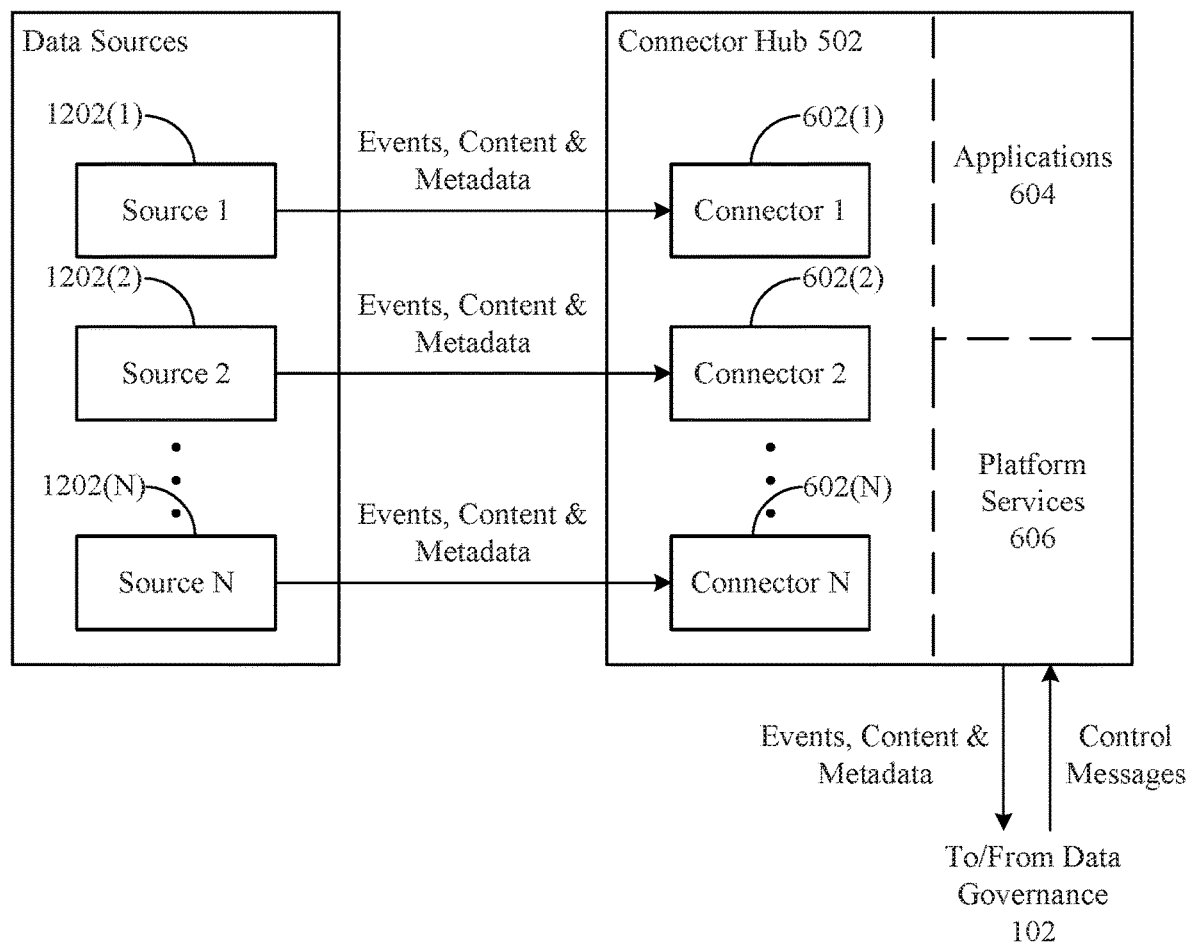
FIG. 12 is a data flow diagram showing the connector hub of FIG. 5 retrieving events, metadata, and content from data sources and forwarding the events, metadata, and content to the data governance system of FIG. 1.

FIG. 12 is a data flow diagram showing connector hub 502 retrieving events, metadata, and content from sources 1202(1-N) of data sources 408 and forwarding the events, metadata, and content to data governance system 102. Each of connectors 602 is associated with a particular one of sources 1202. For example, connector 602(1) can be a directory services connector, while source 1202(1) is a directory service, such as Microsoft Active Directory. When changes are made to sources 1202, events, content and/or metadata are recevied from each of sources 1202 by the corresponding one of connectors 602. Connectors 602 utilize applications 604 to analyze the data pulled from sources 1202, before utilizing platform services 606 to forward the data to data governance system 102.

Figure 13:
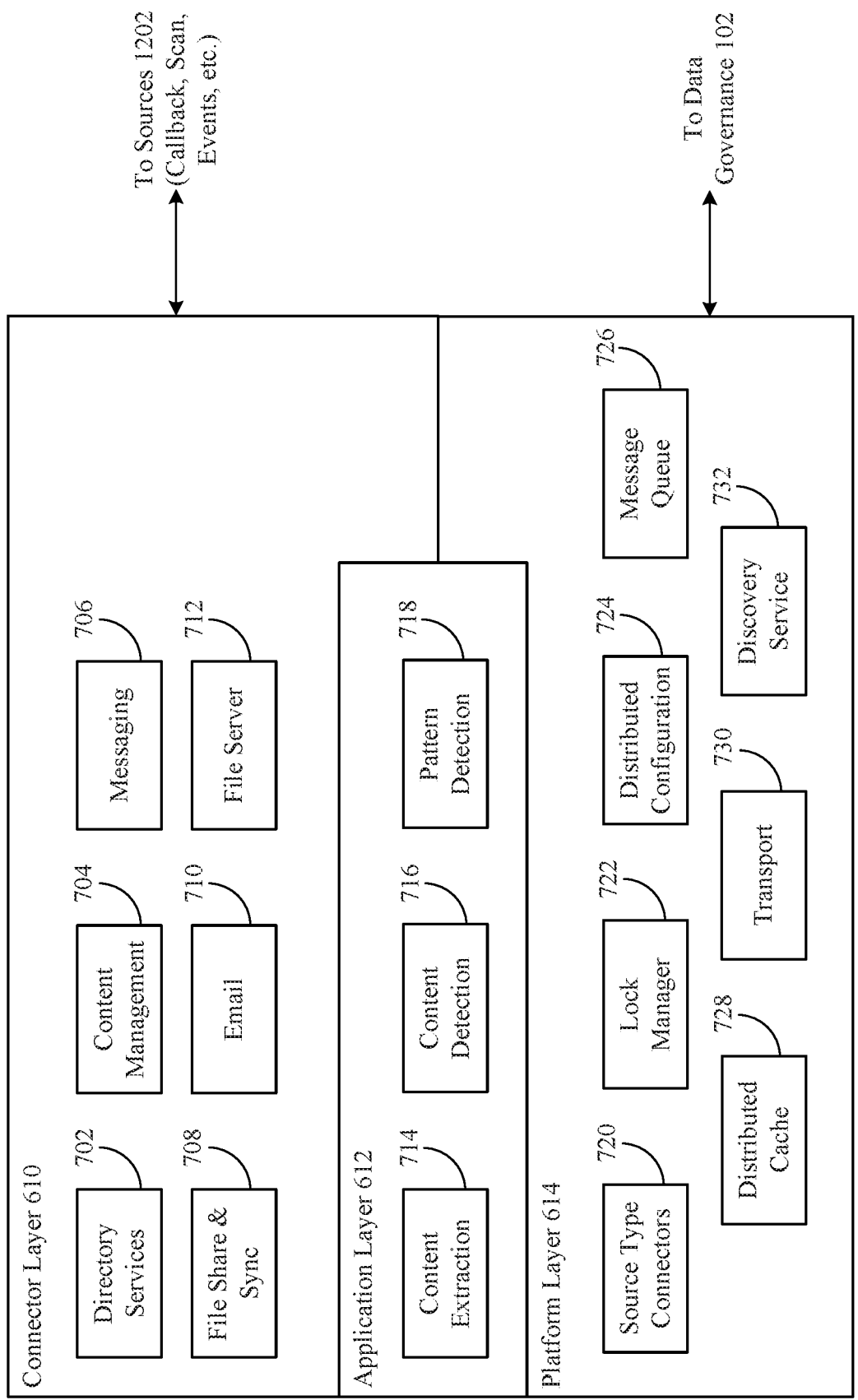
FIG. 13 is a stacked software diagram of the connector hub of FIG. 5, including example ones of the connectors, applications, and platform services of FIG. 6.

FIG. 13 is a stacked software diagram of connector hub 502, including particular ones of connectors 602, applications 604, and platform services 606. Connectors 602 communicate with sources 1202 (FIG. 12) to capture events, metadata, and content indicative of file system operations executed on sources 1202, by any combination of registering system callbacks, scanning the sources, utilizing agents on the sources, etc. These methods will be discussed in further detail with reference to FIGS. 14-20, below. Connector layer 610 includes, by way of non-limiting example, directory service connector 702, content management connector 704, messaging connector 706, file sync and share connector 708, email connector 710, and file server connector 712. Entities of connector layer 610 communicate with entities of application layer 612 and entities of platform services layer 614. The connectors of connector layer 610 utilize applications 604, including content extraction service 714, content detection service 716, and pattern detection service 718, for analysis of the data captured from sources 1202. Each connector of connector layer 610 and each application of application layer 612 utilize platform services of platform services layer 614, including source-type connectors 720, lock manager 722, distributed configuration 724, message queue 726, distributed cache 728, transport service 730, and discovery service 732, to access underlying system hardware and to communicate with one another. Platform services of layer 614 also provide communication with data governance system 102 to provide events, metadata, and content from connectors of connector layer 610, and any modified or created content from applications of application layer 612, to data governance system 102.

FIGS. 14-20 are process flow diagrams showing example methods for generating and processing events according to the present invention. It should be noted that the particular method used for generating and/or processing events is dependent on the source itself and the preferences of the cloud client. For example, the methods available for generating events on a particular source might be limited to comparing metadata snapshots, or the client may choose to utilize only the most secure method for each source. Other considerations include required processing power/memory usage, time efficiency, etc. Additionally, the various methods are shown originating either in connector hub 502 or data governance system 102. However, any of the methods shown can originate in either connector hub 502 or data governance system 102. For example, a method originating in connector hub 502 can originate in data governance system 102, if data governance system 102 sends a request to connector hub 502 to execute the method.

Figure 14:
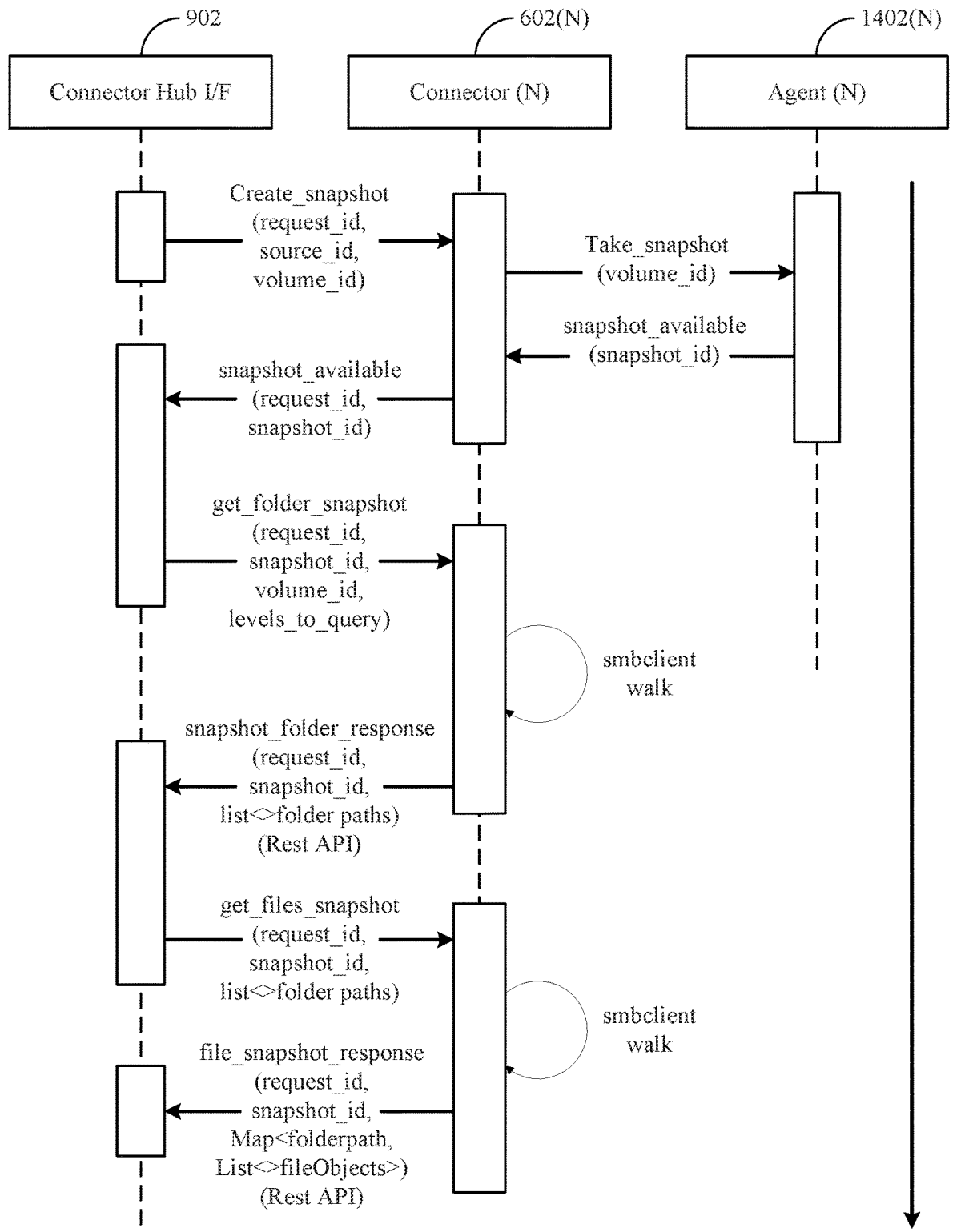
FIG. 14 is a process flow diagram showing an example method for retrieving a snapshot of a source of FIG. 12 via an agent installed on the source.

FIG. 14 is a process flow diagram showing an example method for retrieving a snapshot of source 1202(N) via an agent 1402(N) installed on source 1202(N). To initiate the process, connector hub interface 902 sends a "Create_snapshot" request, which includes a request_id to identify the particular request, a source_id to identify source 1202(N) as the target source, and a volume_id to identify the particular physical or virtual disk(s) of NAS device 402 in which the source is stored. Connector 602(N) processes the request and, in response, requests a snapshot of the specified disk(s) by sending a "Take_snapshot" request to agent 1402(N), including the volume_id. Agent 1402(N) processes the request and acquires a snapshot of the specified disk(s). Agent 1402(N) then sends a "snapshot_available" notification, including a snapshot_id, to connector 602(N). Connector 602(N) then forwards the snapshot_available notification to connector hub interface 902, along with the initial request_id.

Next, connector hub interface 902 retrieves the folder metadata of the snapshot from connector hub 502. Connector hub interface 902 sends a "get_folder_snapshot" request to connector hub 502, including the original request_id, the snapshot_id, the volume_id, and a list of levels to query in the folder tree. Connector hub 502 then walks through the snapshot and gathers the requested folders, one by one. Once the walk is complete, connector hub 502 sends a "snapshot_folder_response", including the request_id, the snapshot_id, and metadata for the list of requested folder paths. The snapshot_folder_response is sent, for example, via REST APIs in order to facilitate the transfer of large amounts of data over an Internet connection.

Finally, connector hub interface 902 retrieves the file snapshot from connector hub 502. In response to receiving the snapshot_folder_response, connector hub interface 902 sends a "get_files_snapshot" request to connector hub 502, including the request_id, the snapshot_id, and the list of folder paths previously provided by connector hub 502. Again, connector hub 502 walks through the snapshot and generates a list of the data objects in the specified folders. Connector hub 502 then sends a "file_snapshot_response" to connector hub interface 902, including the request_id, the snapshot_id, a map of the previously requested folder paths, and a list of file objects contained in each folder of the specified folder paths. The snapshot_file_response is sent, for example, via REST APIs.

Figure 15A:
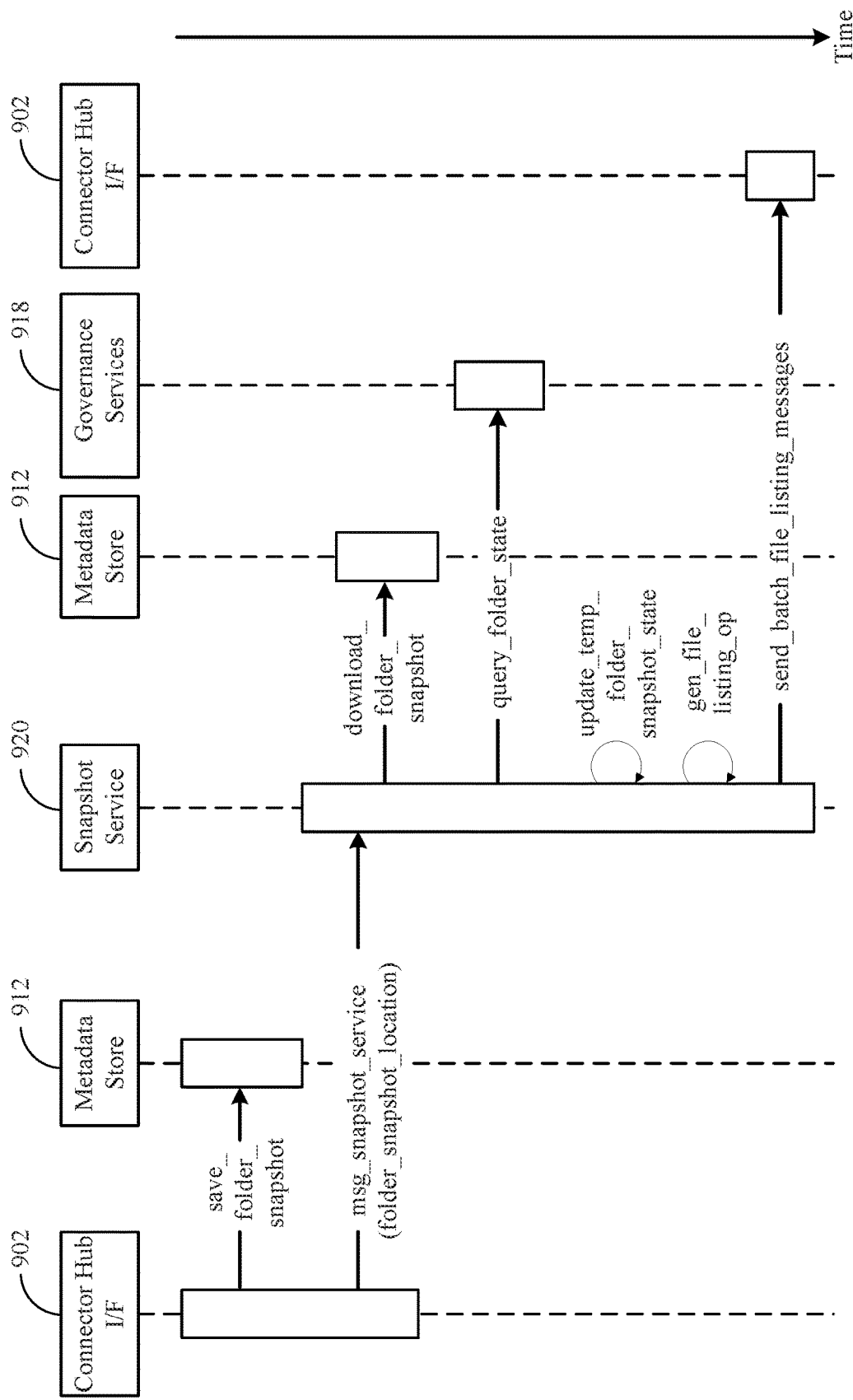
FIG. 15A is a process flow diagram showing an example method for processing a folder snapshot in the data governance server of FIG. 8.
Figure 15B:
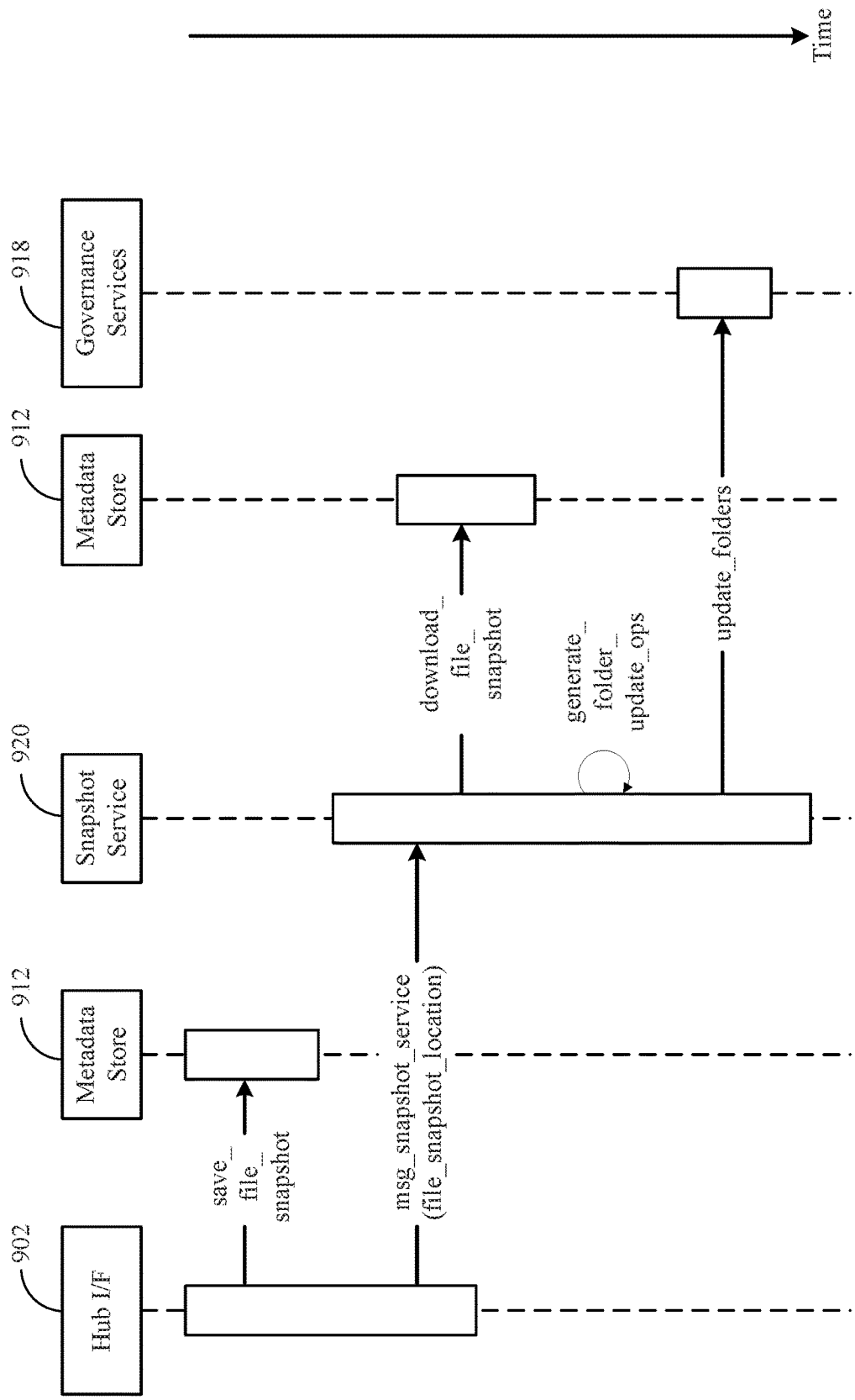
FIG. 15B is a process flow diagram showing an example method for processing a file snapshot in the data governance server of FIG. 8.

FIGS. 15A and 15B illustrate a an efficient method for updating the derivative data set located on the cloud, without pulling a full snapshot from the data source located at client site 118 or cloud-based storage 106 (FIG. 1). Rather than pull a full snapshot of the local file storage system, cloud-based data governance system 102 pulls a folder snapshot (FIG. 15A), updates the folder state based on the folder snapshot, then requests (FIG. 15A) and receives (FIG. 15B) file snapshots only for those folders that were changed.

FIG. 15A is a process flow diagram showing an example method for processing the folder snapshot in data governance server 806(1). Initially, connector hub interface 902 saves the folder snapshot in metadata store 912, before sending a message, indicating the location of the folder snapshot, to snapshot service 920, via governance services manager 916, message processor 908, and incoming queue 904 (FIG. 9). Snapshot service 920 then downloads the folder snapshot from the specified location on metadata store 912 and utilizes governance services 918 to query a folder state of the derivative data set saved on metadata store 912. Snapshot service 920 then updates the temporary folder snapshot state and generates file listing operations. Finally, snapshot service 920 sends the batch file listing messages to connector hub interface 902.

FIG. 15B is a process flow diagram showing an example method for processing the file snapshot(s) in data governance server 806(1). Initially, connector hub interface 902 saves the file snapshot in metadata store 912, before sending a message, indicating the location of the file snapshot, to snapshot service 920, via governance services manager 916, message processor 908, and incoming queue 904 (FIG. 9). Snapshot service 920 then downloads the file snapshot from the specified location on metadata store 912 and analyzes the snapshot to generate a list of folder update operations. Finally, snapshot service 920 utilizes governance services 918 to update the folders of the derivative data set on metadata store 912 based on the generated folder update operations.

Figure 16:
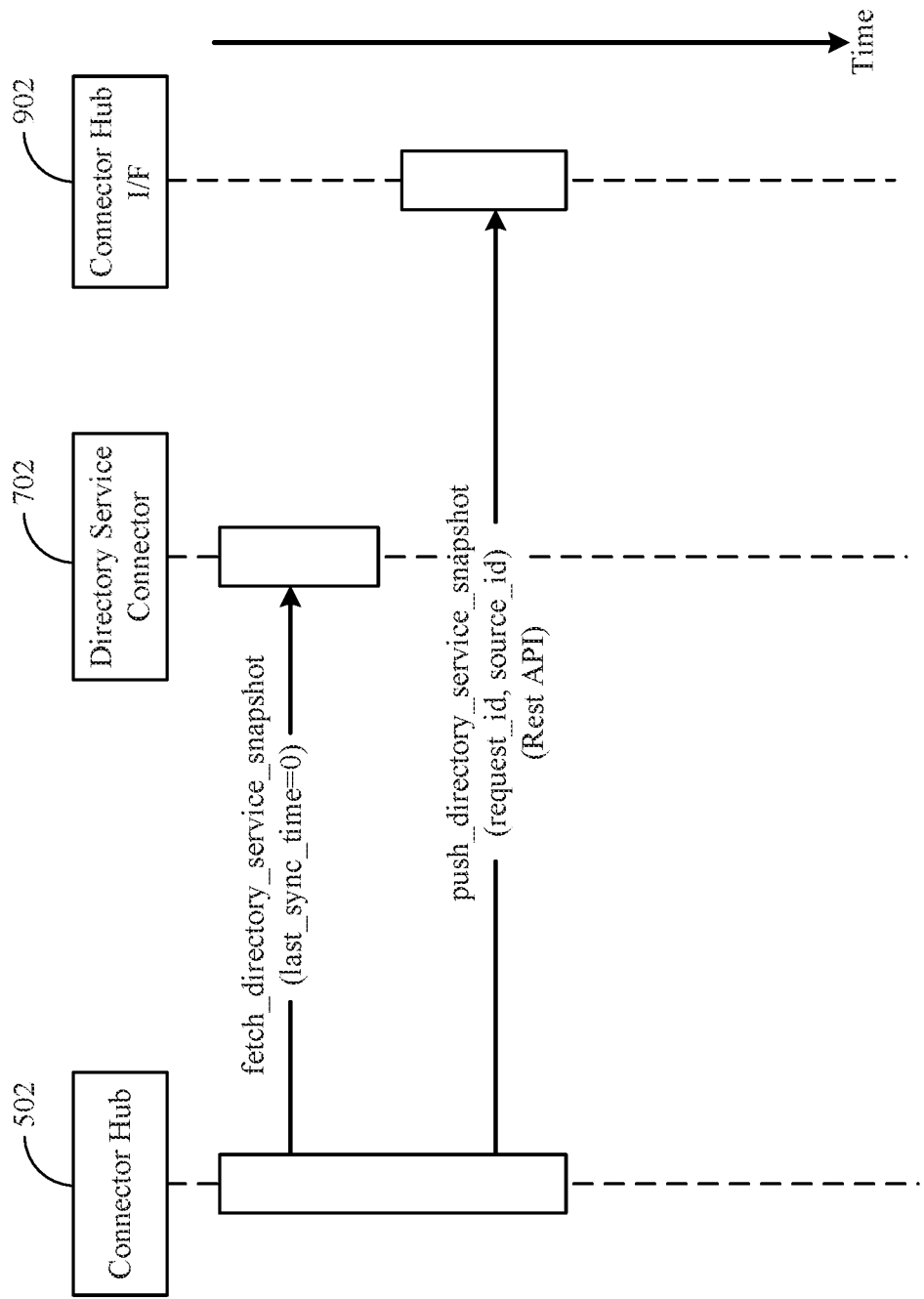
FIG. 16 is a process flow diagram showing a particular example method for providing a directory service snapshot to the data governance server of FIG. 8.

FIG. 16 is a process flow diagram showing a particular example method for providing a directory service snapshot to data governance server 806(1). First, connector hub 502 fetches the directory service snapshot from directory service connector 702. Then, connector hub 502 pushes the directory service snapshot to connector hub interface 902, along with the request_id and the source_id (FIG. 14).

Figure 17:
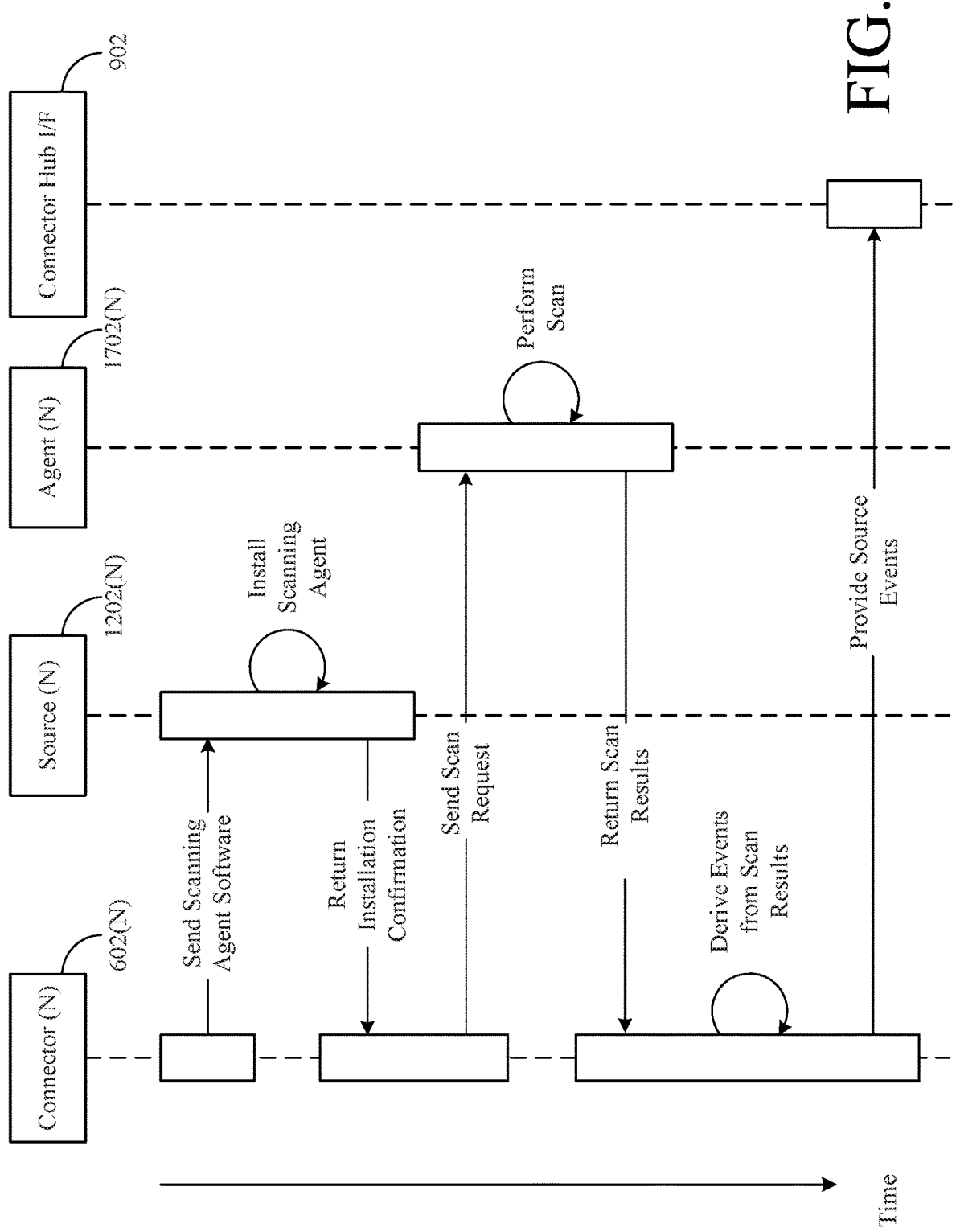
FIG. 17 is a process flow diagram showing an example method for scanning a source of FIG. 12 to generate events.

FIG. 17 is a process flow diagram showing an example method for scanning source 1202(N) to generate events. Initially, connector 602(N) provides scanning agent software to source 1202(N), which installs the scanning agent and returns an installation confirmation. Next, connector 602(N) sends a scan request to an agent 1702(N), which was installed on source 1202(N). Agent 1702(N) performs the scan of source 1202(N) and returns the scan results. Finally, connector 602(N) derives events from the scan results and provides the events to connector hub interface 902.

Figure 18:
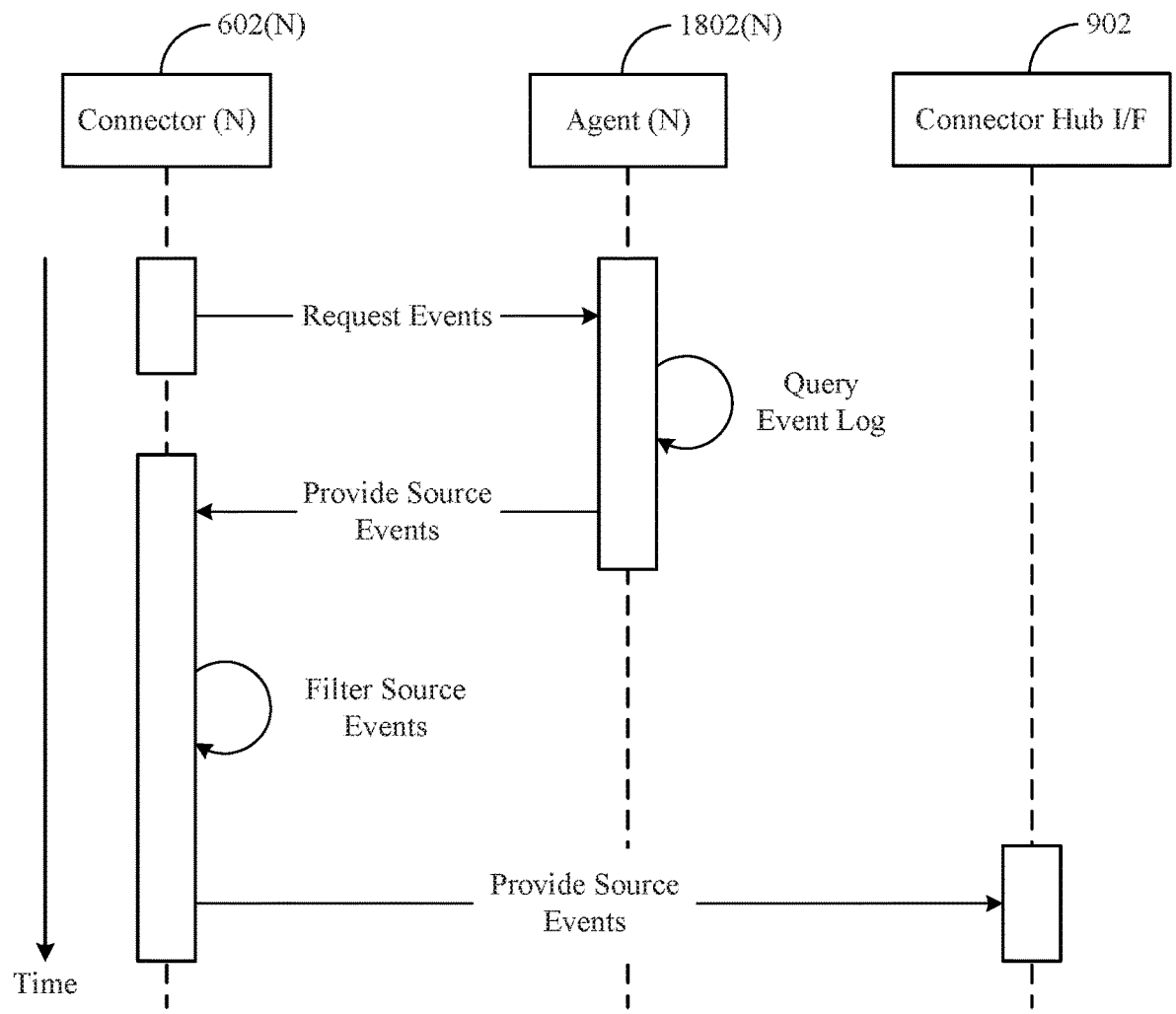
FIG. 18 is a process flow diagram showing an example method for intercepting and filtering events via an agent on a source of FIG. 12.

FIG. 18 is a process flow diagram showing an example method for intercepting and filtering events via an agent 1802(N) on the source. Initially, connector 602(N) sends a request for events to agent 1802(N). Agent 1802(N) queries an event log, generated in response to changes/access to source 1202(N), and provides any new events to connector 602(N). Then, connector 602(N) filters the events to remove any redundant/unwanted events. Finally, connector 602(N) provides the events to connector hub interface 902.

Figure 19:
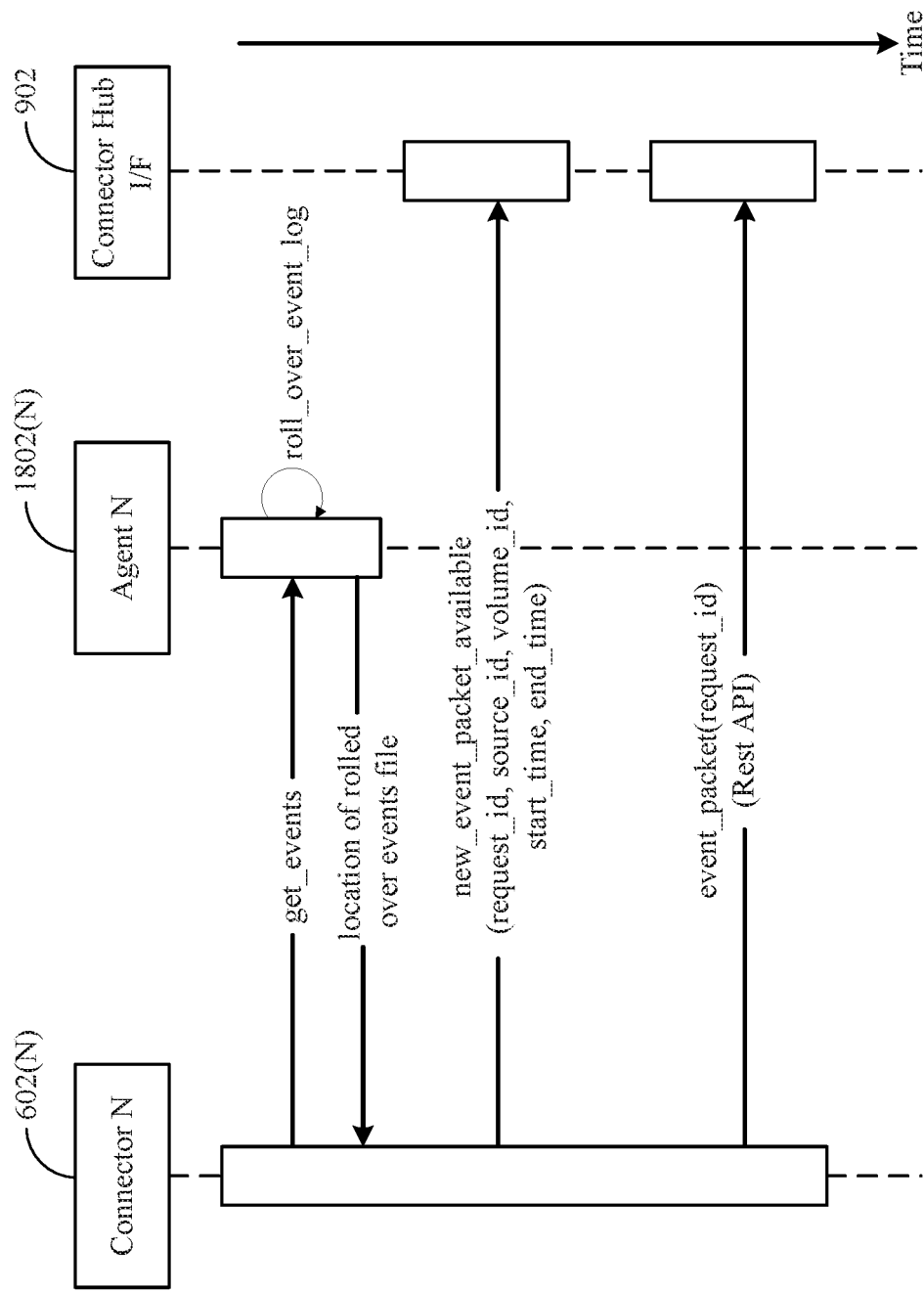
FIG. 19 is a process flow diagram showing a particular example method for intercepting and filtering events via the agent of FIG. 18.

FIG. 19 is a process flow diagram showing a particular example method for intercepting and filtering events via agent 1802(N). Initially, connector 602(N) sends a "get_events" request to Agent 1802(N), which rolls over the event log and returns the location of a rolled over events file to connector 602(N). Next, connector 602(N) sends a "new_event_packet_available" notification, including a request_id, a source_id, a volume_id, a start_time indicating a time stamp of the first event, and an end_time indicating a time stamp of the final event, to connector hub interface 902. Finally, connector 602(N) provides the event packet, including the request_id, to connector hub interface 902, via REST APIs.

Figure 20:
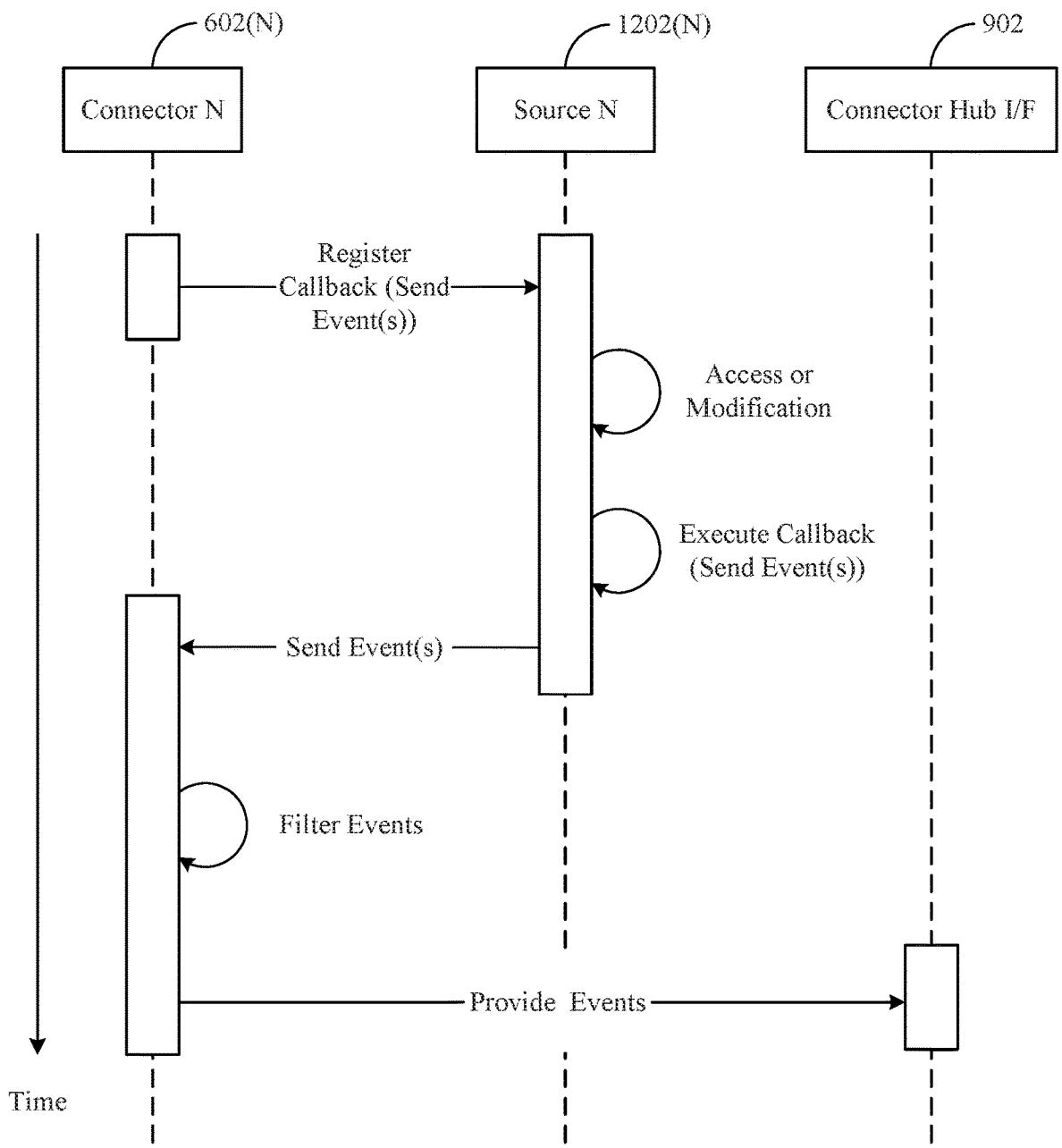
FIG. 20 is a process flow diagram showing an example method for receiving events from the source of FIG. 12 by registering for callbacks.

FIG. 20 is a process flow diagram showing an example method for receiving events from source 1202(N) by registering for callbacks. Initially, connector 602(N) registers for callbacks from source 1202(N), whenever source 1202(N) is accessed or modified. Next, source 1202(N) is accessed and/or modified by one of local clients 120 (FIG. 1) and executes the callback by sending events related to the access/modification to connector 602(N). Finally, connector 602(N) filters the events and provides them to connector hub interface 902.

Figure 21:
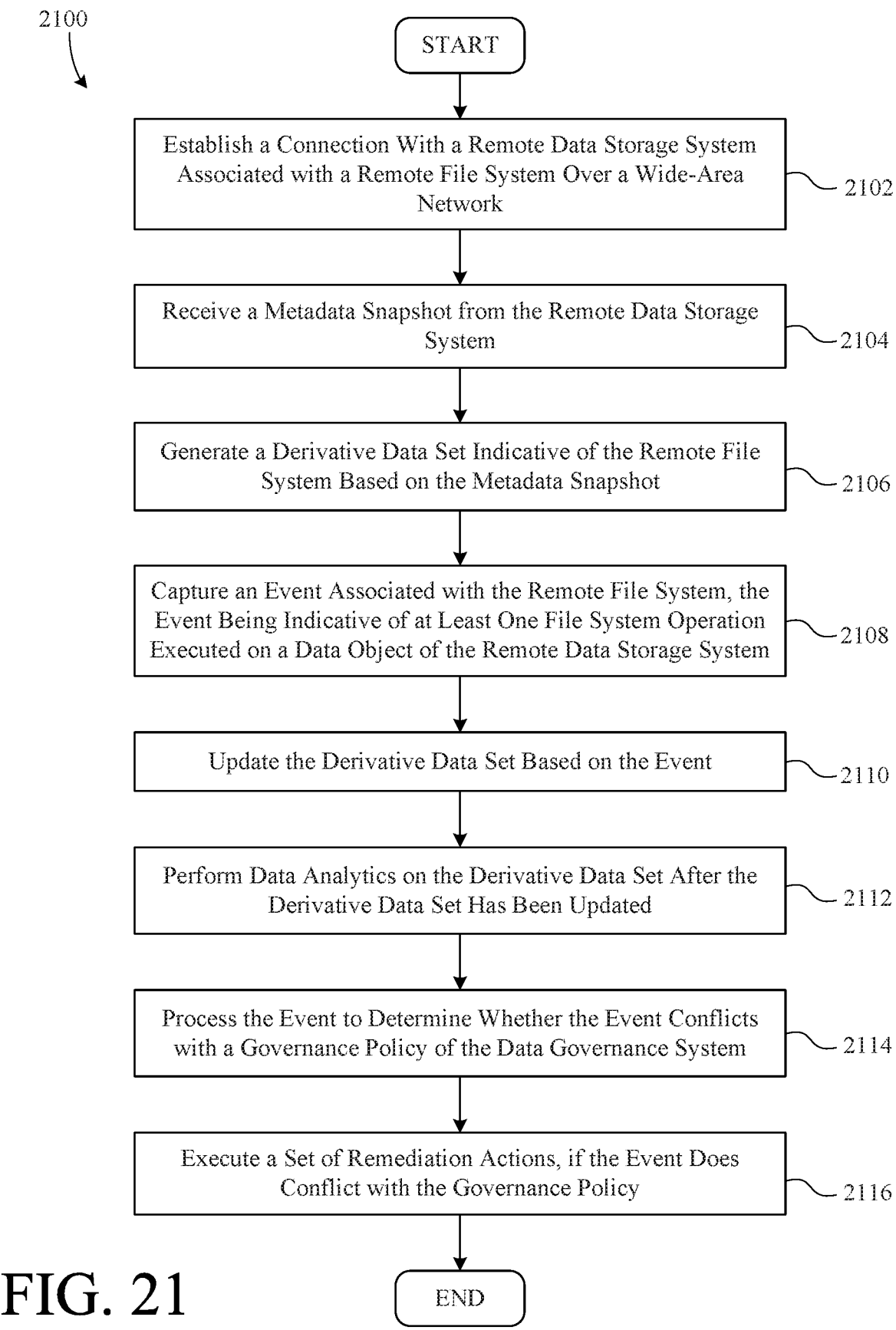
FIG. 21 is a flow chart summarizing an example method of performing data governance from a site remote from a data source.

FIG. 21 is a flow chart summarizing an example method 2100 of providing data governance services from a site remote from the governed data source. In a first step 2102, a connection with a remote data storage system associated with a remote file system is established over a wide-area network. Then, in a second step 2104, a metadata snapshot is received from the remote data storage system. Next, in a third step 2106, a derivative data set indicative of the remote file system is generated based on the metadata snapshot. Then, in a fourth step 2108, an event associated with the remote file system is captured. The event is indicative of at least one file system operation executed on a data object of the remote data storage system. Next, in a fifth step 2110, the derivative data set is updated based on the event. Then, in a sixth step 2112, data analytics are performed on the derivative data set, after the derivative data set has been updated. Next, in a seventh step 2114, the event is processed to determine whether the event conflicts with a governance policy of the data governance system. Finally, in an eighth step 2116, a set of remediation events are executed, if the event conflicts with the governance policy.

Figure 22:
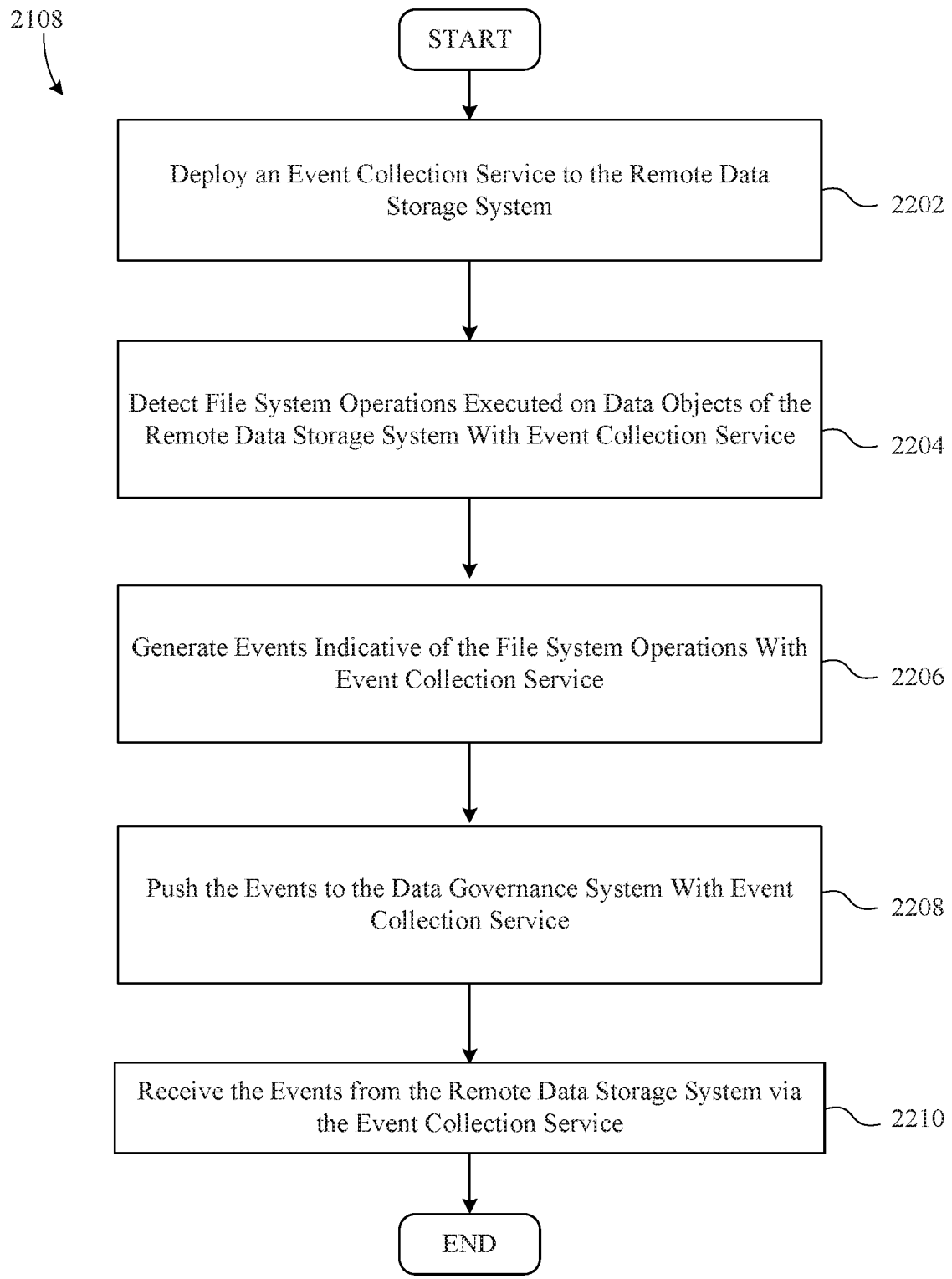
FIG. 22 is a flow chart summarizing an example method of performing the fourth step of the method of FIG. 21.

FIG. 22 is a flow chart summarizing an example method of performing fourth step 2108 of method 2100. In a first step 2202, an event collection service is deployed to the remote data storage system. Then, in a second step 2204, file system operations executed on data objects of the remote data storage system are detected with the event collection service. Next, in a third step 2206, events indicative of the file system operations are generated with the event collection service. Next, in a fourth step 2208, the events are pushed to the data governance system by the event collection service. Finally, in a fifth step 2210, the events are received from the remote data storage system via the event collection service.

Figure 23:
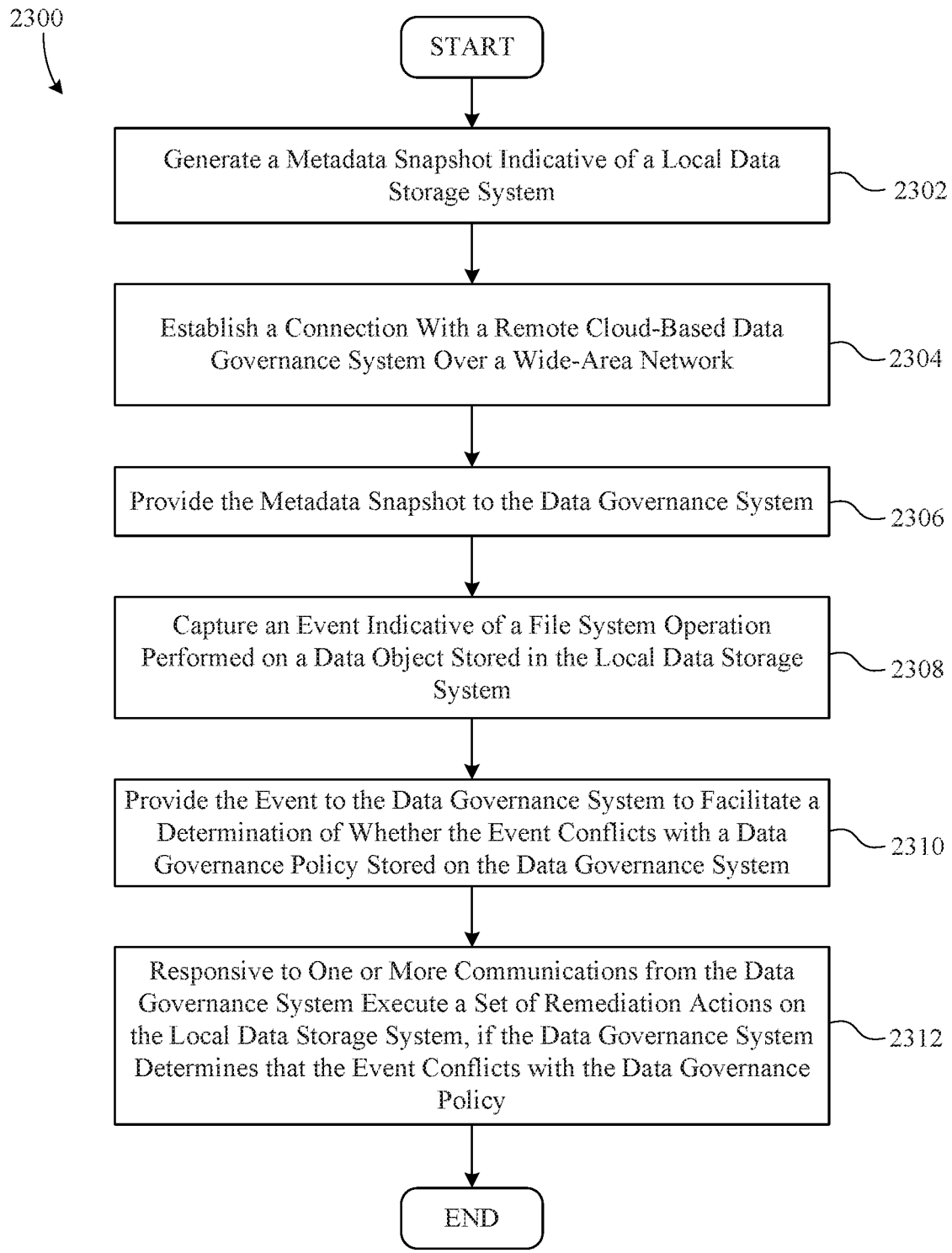
FIG. 23 is a flow chart summarizing a method of utilizing data governance services from a remote site.

FIG. 23 is a flow chart summarizing an example method 2300 of utilizing data governance services from a remote site. In a first step 2302, a metadata snapshot indicative of a local data storage system is generated. Then, in a second step 2304, a connection is established with a remote cloud-based data governance system over a wide-area network. Next, in a third step 2306, the metadata snapshot is provided to the data governance system. Then, in a fourth step 2308, an event indicative of a file system operation performed on a data object stored in the local data storage system is captured. Next, in a fifth step 2310, the event is provided to the data governance system to facilitate a determination of whether the event conflicts with a data governance policy stored on the data governance system. Finally, in a sixth step 2312, responsive to one or more communication from the data governance system, a set of remediation actions is executed on the local data storage system, if the data governance system determines that the event conflicted with the data governance policy.

Figure 24:
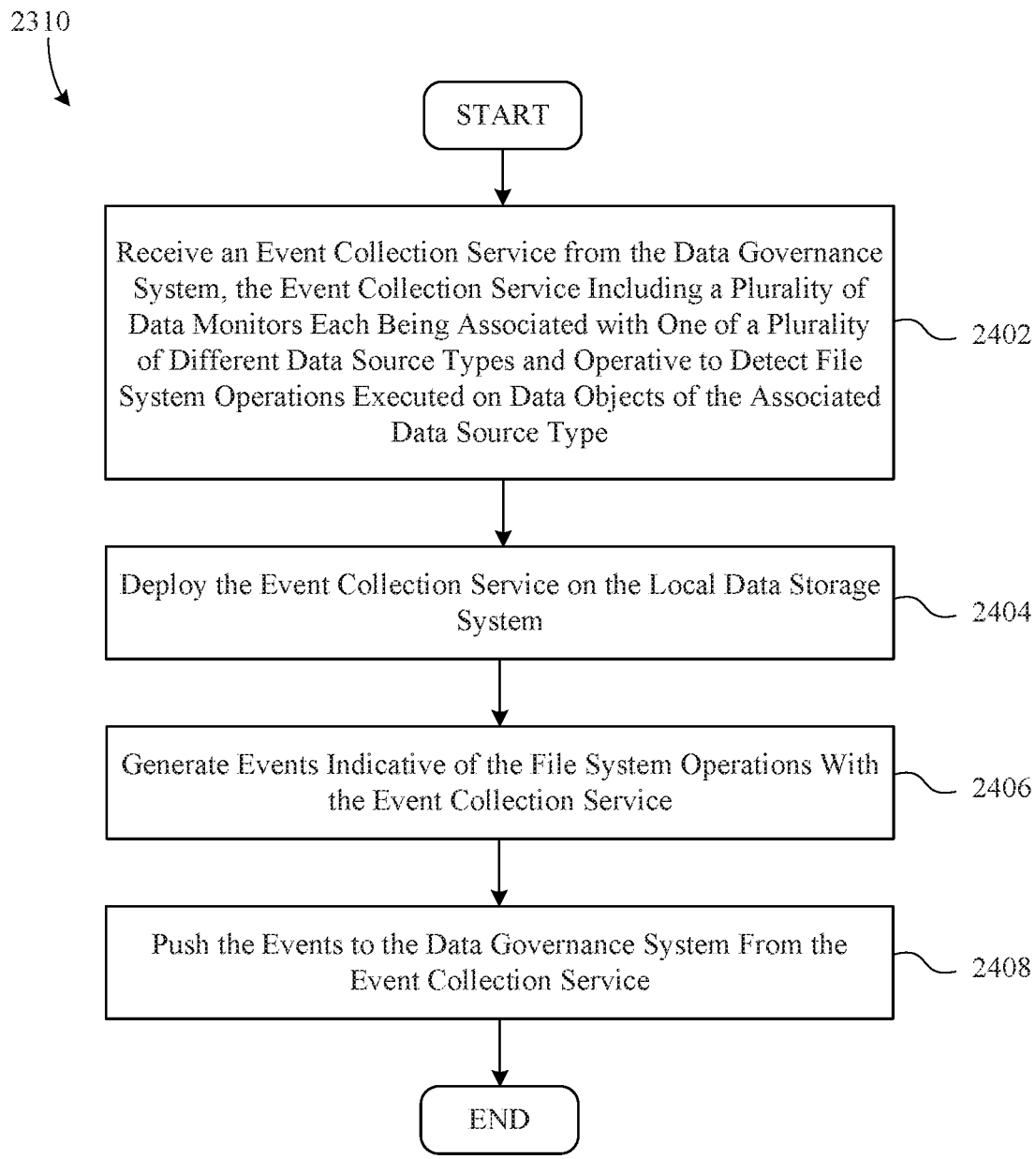
FIG. 24 is a flow chart summarizing an example method of performing the fourth and fifth steps of the method of FIG. 23.

FIG. 24 is a flow chart summarizing an example method of performing fourth step 2308 and fifth step 2310 of method 2300. In a first step 2402, an event collection service is received from the data governance system. The event collection service includes a plurality of data monitors that are each associated with one of a plurality of different data source types. The data monitors are operative to detect file system operations executed on data objects of the associated data source type. Next, in a second step 2404, the event collection service is deployed on the local data storage system. Then, in a third step 2406, events indicative of file system operations on the local data storage system are generated by the event collection service. Finally, in a fourth step 2408, the generated events are pushed to the remote data governance system from the event collection service.

The description of particular embodiments of the present invention is now complete. Many of the described features may be substituted, altered or omitted without departing from the scope of the invention. For example, alternate connectors (e.g., smartphone connectors, CAD connectors, etc.), may augment or be substituted for any of the example connectors 602. As another example, additional event collection mechanisms can be used by connector hub 502 or cloud connectors 906, in order to generate file system events. These and other deviations from the particular embodiments shown will be apparent to those skilled in the art, particularly in view of the foregoing disclosure.

We claim:

1. A method performed by a local data storage system for utilizing cloud-based data governance, said method comprising:
   providing instructions to a cloud-based, multi-tenant data governance system to customize a first set of data governance policies and to associate said customized first set of data governance policies with a first cloud client;
   capturing an event indicative of a file system operation performed on a data object stored in said local data storage system, said file system operation being a modification or an access of said data object;
   establishing a network connection with a geographically remote data governance server of said cloud-based, multi-tenant data governance system over a wide-area network (WAN);
   providing information to said data governance server over said WAN to associate said local data storage system with said first set of customized data governance policies stored on said data governance server;
   providing said event to said data governance server to facilitate a determination of whether said event conflicts with said customized first set of data governance policies stored on said data governance server;
   receiving over said WAN one or more communications from said data governance server including instructions to perform a set of remediation actions on said local data storage system, when said data governance server determines that said event conflicts with a data governance policy of said customized first set of data governance policies stored on said data governance server; and
   executing said set of remediation actions on said local data storage system.

2. The method of claim 1, wherein said step of capturing an event includes deploying a plurality of data monitors, each of said plurality of data monitors being associated with one of a plurality of different data source types and operative to detect file system operations executed on data objects of said associated data source type, generate events indicative of said file system operations, and push said events to said data governance server.

3. The method of claim 2, wherein said step of generating events includes scanning at least one of said data source types at different times.

4. The method of claim 2, wherein said step of generating events includes registering for callbacks from an application associated with at least one of said data source types.

5. The method of claim 2, wherein said step of generating events includes intercepting and filtering events from at least one of said data source types.

6. The method of claim 5, wherein said steps of intercepting and filtering events from said at least one of said data source types includes installing an agent on-site with said local data storage system, said agent being configured to intercept and filter said events.

7. The method of claim 1, wherein said step of capturing an event includes capturing metadata associated with one or both of said file system operation and said data object.

8. The method of claim 7, wherein said step of capturing metadata includes capturing metadata identifying a particular user performing said file system operation on said data object.

9. The method of claim 8, wherein said step of executing said set of remediation actions on said local data storage system includes altering permissions associated with said particular user.

10. The method of claim 1, wherein said step of receiving over said WAN one or more communications from said data governance server includes receiving one or more control messages indicating said set of remediation actions to be executed on said local data storage system.

11. The method of claim 1, wherein said step of providing said event to said data governance server includes providing metadata of a file system associated with said local data storage system to facilitate creation or updating of a derivative data set by said data governance server.

12. The method of claim 11, wherein said step of providing said event to said data governance server includes providing at least a portion of said data object to facilitate the creation or updating of said derivative data set by said data governance server.

13. A local data storage system comprising:
   a hardware processor configured to execute code, said code including a set of instructions that cause said hardware processor to execute associated actions;
   a network adapter electrically coupled to establish a network connection with a geographically remote cloud-based, multi-tenant data governance system over a wide-area network (WAN); and
   memory for storing data and said code, said data and said code including
      an event collection service including a first subset of said set of instructions configured to capture an event, said event being indicative of a file system operation performed on a data object of said local data storage system,
      a data governance interface including
         a second subset of said set of instructions configured to provide information to said cloud-based, multi-tenant data governance system to customize a first set of data governance policies and to associate said customized first set of data governance policies with a first cloud client;
         a third subset of said set of instructions configured to provide information to a data governance server of said cloud-based, multi-tenant data governance system over said WAN to associate said local data storage system with said customized first set of data governance policies,
         a fourth subset of said set of instructions configured to provide said event to said data governance server over said WAN to facilitate a determination of whether said event conflicts with said customized first set of data governance policies, and
      an enforcement module including a fifth subset of said set of instructions configured to receive over said WAN communications from said data governance server, said communications including instructions to perform a set of remediation actions on said local data storage system when said data governance server determines that said event creates a conflict with a data governance policy of said customized first set of data governance policies, said fifth subset of instructions being operative to perform said set of remediation actions on said local data storage system.

14. The system of claim 13, wherein said event collection service includes a plurality of data monitors, each of said plurality of data monitors being associated with one of a plurality of different data source types and operative to detect file system operations executed on an associated data source of said associated type, generate events indicative of said file system operations, and push said events to said data governance server.

15. The system of claim 14, wherein at least one of said data monitors is configured to scan said associated data source at different times in order to detect said file system operations.

16. The system of claim 14, wherein at least one of said data monitors is configured to register for callbacks from an application associated with said associated data source type in order to detect said file system operations.

17. The system of claim 14, wherein at least one of said data monitors is configured to intercept and filter events related to said associated data source in order to detect said file system operations.

18. The system of claim 17, wherein said at least one of said data monitors is configured to install an agent on said associated data source, said agent being configured to intercept and filter said events.

19. The system of claim 14, wherein said data monitors are additionally configured to capture metadata associated with one or both of said file system operation and said data object.

20. The system of claim 19, wherein said metadata is indicative of a particular user performing said file system operation on said data object.

21. The system of claim 20, wherein said remediation actions include altering permissions associated with said particular user.

22. The system of claim 13, wherein said enforcement module is configured to:
receive one or more control messages indicating said set of remediation actions to be executed on said local file storage system; and
execute said set of remediation actions responsive to said one or more control messages.

23. The system of claim 13, wherein said local data storage system is operative to provide to said data governance server metadata of a file system associated with said data object to facilitate creation or updating of a derivative data set by said data governance server.

24. The system of claim 23, wherein said local data storage system is operative to provide to said data governance server at least a portion of said data object to facilitate the creation or updating of said derivative data set by said data governance server.

25. An event collection system deployable on a file storage system, said event collection system comprising:
a hardware processor configured to execute code, said code including a set of instructions which cause said hardware processor to execute associated actions;
a network adapter electrically coupled to establish a network connection to a data governance server of a cloud-based, multi-tenant data governance system over a wide-area network (WAN), said cloud-based, multi-tenant data governance system being located geographically remotely from said event collection system; and
memory for storing data and said code, said data and said code comprising
a plurality of source connector routines each including a subset of said set of instructions configured to monitor a corresponding one of a plurality of particular data sources on said file storage system and to generate an event responsive to a file system operation being executed on a data object associated with said one of said plurality of particular data sources, said event being indicative of said file system operation, and
a data governance interface including
another subset of said set of instructions configured to push said event to said cloud-based, multi-tenant data governance system, and
a third subset of said set of instructions configured to push information to said cloud-based, multi-tenant data governance system over said WAN to associate said event collection system with a first set of data governance policies stored on said cloud-based, multi-tenant data governance server; and
wherein
said one of said plurality of particular data sources includes first source data of a first type;
a second one of said plurality of particular data sources includes second source data of a second type different than said first type;
a first one of said source connector routines is compatible with said first data source, but not said second data source;
a second one of said source connector routines is compatible with said second data source, but not said first data source; and
said first one of said source connector routines is configured to
receive, responsive to said event being received by said cloud-based, multi-tenant data governance system, a request to provide a first data object of said first type corresponding to said event to said data governance service, and
provide said first data object of said first type to said cloud-based, multi-tenant data governance server, said first data object of said first type originating from said first data source.

* * * * *